United States Patent
Sung et al.

(10) Patent No.: US 11,335,325 B2
(45) Date of Patent: May 17, 2022

(54) ELECTRONIC DEVICE AND CONTROLLING METHOD OF ELECTRONIC DEVICE

(71) Applicant: Samsung Electronics Co., Ltd., Suwon-si (KR)

(72) Inventors: Hosang Sung, Suwon-si (KR); Seonho Hwang, Suwon-si (KR); Doohwa Hong, Seoul (KR); Eunmi Oh, Suwon-si (KR); Kyoungbo Min, Suwon-si (KR); Jonghoon Jeong, Suwon-si (KR); Kihyun Choo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 16/749,257

(22) Filed: Jan. 22, 2020

(65) Prior Publication Data

US 2020/0234693 A1   Jul. 23, 2020

(30) Foreign Application Priority Data

Jan. 22, 2019  (KR) .................. 10-2019-0007869
Nov. 11, 2019  (KR) .................. 10-2019-0143532

(51) Int. Cl.
*G10L 13/08*    (2013.01)
*G10L 15/22*    (2006.01)
(Continued)

(52) U.S. Cl.
CPC .............. *G10L 13/08* (2013.01); *G10L 13/00* (2013.01); *G10L 13/033* (2013.01);
(Continued)

(58) Field of Classification Search
CPC ......... G10L 13/08; G10L 13/00; G10L 13/33; G10L 13/047; G10L 15/02; G10L 15/1815; G10L 15/22
See application file for complete search history.

(56) References Cited

U.S. PATENT DOCUMENTS 8,571,871 B1   10/2013   Stuttle et al.
9,978,359 B1    5/2018   Kaszczuk et al.
(Continued)

FOREIGN PATENT DOCUMENTS

EP        3 382 698 A1   10/2018
KR   10-2018-0110979 A   10/2018

OTHER PUBLICATIONS

Yuxuan Wang et al., "Style Tokens: Unsupervised Style Modeling, Control and Transfer in End-to-End Speech Synthesis" Submitted on Mar. 23, 2018.
(Continued)

*Primary Examiner* — Huyen X Vo
*Assistant Examiner* — Athar N Pasha
(74) *Attorney, Agent, or Firm* — Jefferson IP Law, LLP

(57) ABSTRACT

An electronic device and a controlling method of the electronic device are provided. The electronic device acquires text to respond on a received user's speech, acquires a plurality of pieces of parameter information for determining a style of an output speech corresponding to the text based on information on a type of a plurality of text-to-speech (TTS) databases and the received user's speech, identifies a TTS database corresponding to the plurality of pieces of parameter information among the plurality of TTS databases, identifies a weight set corresponding to the plurality of pieces of parameter information among a plurality of weight sets acquired through a trained artificial intelligence model, adjusts information on the output speech stored in the TTS database based on the weight set, synthesizes the output
(Continued)

speech based on the adjusted information on the output speech, and outputs the output speech corresponding to the text.

15 Claims, 11 Drawing Sheets

(51) Int. Cl.
    *G10L 15/18*     (2013.01)
    *G10L 13/047*     (2013.01)
    *G10L 13/033*     (2013.01)
    *G10L 15/02*     (2006.01)
    *G10L 13/00*     (2006.01)

(52) U.S. Cl.
    CPC ............ *G10L 13/047* (2013.01); *G10L 15/02* (2013.01); *G10L 15/1815* (2013.01); *G10L 15/22* (2013.01)

(56) References Cited

U.S. PATENT DOCUMENTS

| | | | |
|---|---|---|---|
| 10,074,359 B2 | 9/2018 | Silveira Ocampo | |
| 10,319,365 B1 * | 6/2019 | Nicolis | G10L 15/26 |
| 10,365,887 B1 * | 7/2019 | Mulherkar | G06F 3/167 |
| 11,016,968 B1 * | 5/2021 | Hoover | G10L 15/22 |
| 2002/0120450 A1 * | 8/2002 | Junqua | G10L 13/04 704/258 |
| 2004/0019484 A1 | 1/2004 | Kobayashi et al. | |
| 2006/0085183 A1 | 4/2006 | Jain | |
| 2007/0244702 A1 * | 10/2007 | Kahn | G10L 15/22 704/E15.04 |
| 2008/0010070 A1 * | 1/2008 | Kim | G10L 13/10 704/259 |
| 2008/0065383 A1 * | 3/2008 | Schroeter | G10L 13/06 704/260 |
| 2010/0066742 A1 * | 3/2010 | Qian | G10L 13/10 345/440.1 |
| 2016/0071510 A1 | 3/2016 | Li et al. | |
| 2017/0092258 A1 * | 3/2017 | Edrenkin | G10L 13/08 |
| 2017/0110110 A1 | 4/2017 | Pollet | |
| 2018/0096677 A1 | 4/2018 | Pollet et al. | |
| 2019/0202063 A1 * | 7/2019 | Shukla | G10L 15/26 |

OTHER PUBLICATIONS

International Search Report dated May 13, 2020, issued in International Patent Application No. PCT/KR2020/001022.

* cited by examiner

FIG. 4B
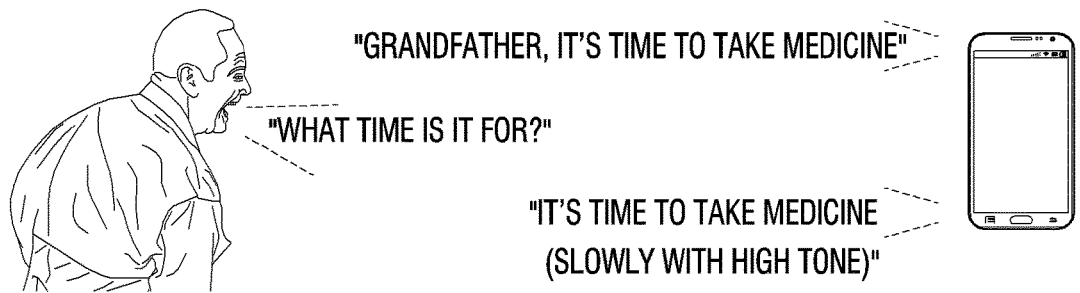
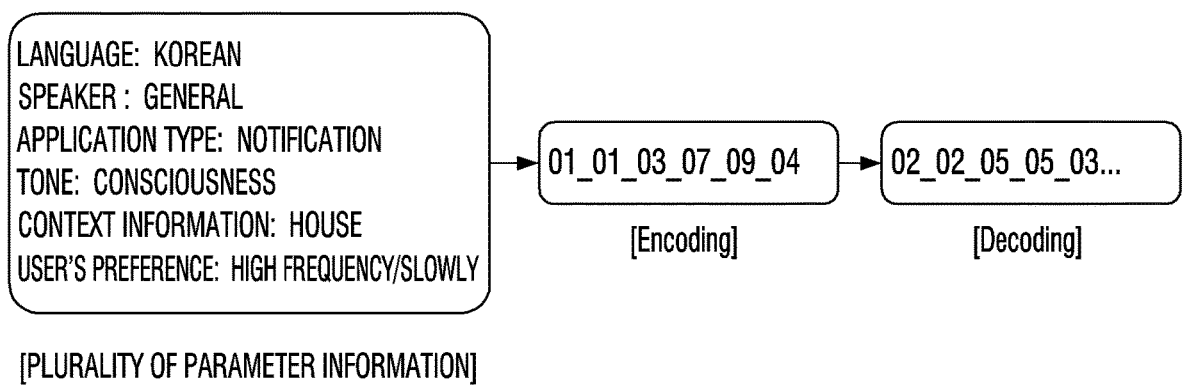
[PLURALITY OF PARAMETER INFORMATION]

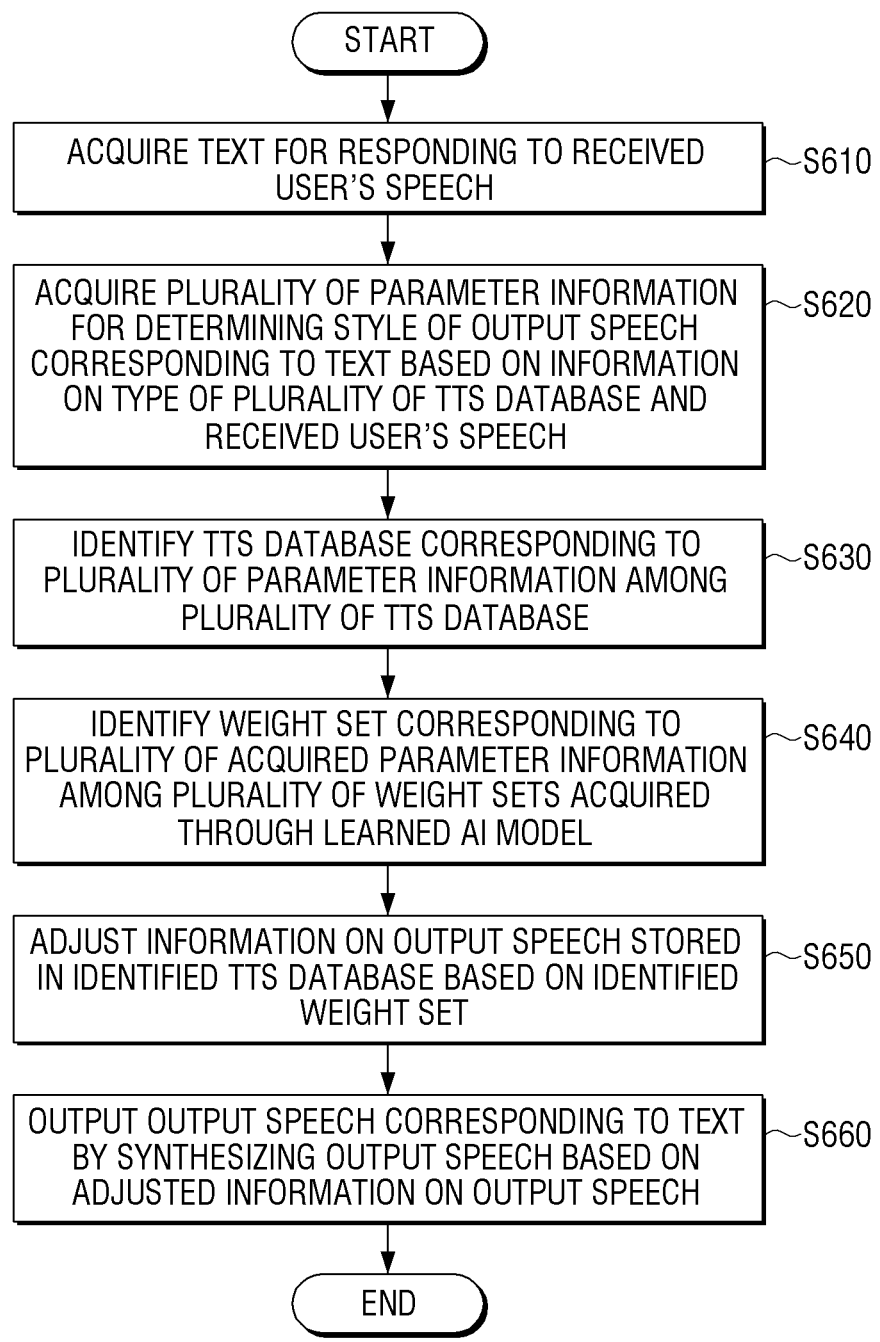

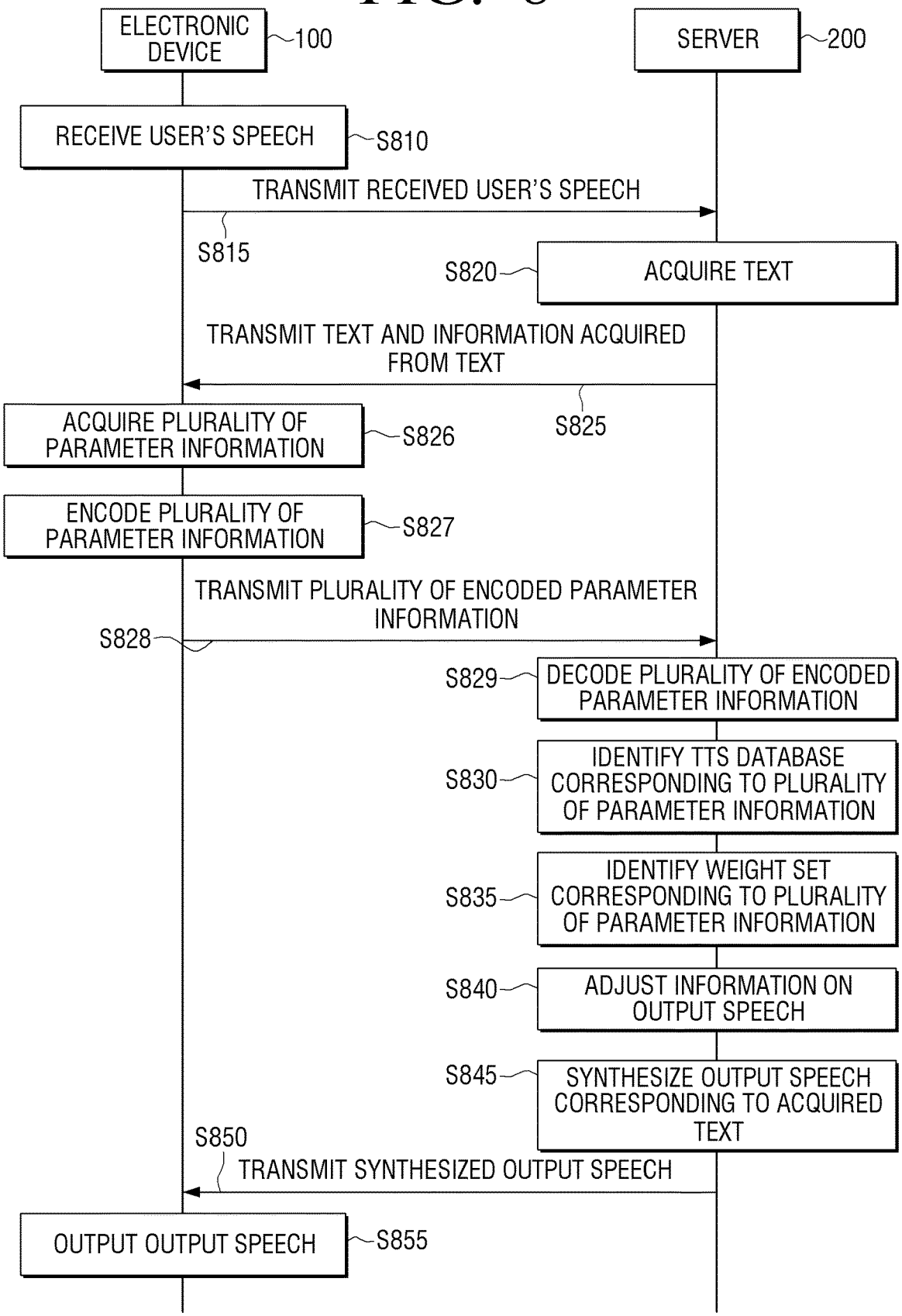

ELECTRONIC DEVICE AND CONTROLLING METHOD OF ELECTRONIC DEVICE

CROSS-REFERENCE TO RELATED APPLICATION(S)

This application is based on and claims priority under 35 U.S.C. § 119(a) of a Korean patent application number 10-2019-0007869, filed on Jan. 22, 2019, in the Korean Intellectual Property Office, and of a Korean patent application number 10-2019-0143532, filed on Nov. 11, 2019, in the Korean Intellectual Property Office, the disclosure of each of which is incorporated by reference herein in its entirety.

BACKGROUND

1. Field

The disclosure relates to an electronic device and a controlling method of the electronic device. More particularly, the disclosure relates to an electronic device capable of providing a customized output speech by reflecting acquired information in real time, and a controlling method thereof.

2. Description of Related Art

With recent advances in an artificial intelligence technology, a speech synthesis technology (e.g., text-to-speech (TTS)) has been used in a variety of technical fields, such as interactive personal assistant agents, artificial intelligence speakers, and robotics, along with a speech recognition technology.

However, the speech synthesis technology of the related art generally reads and delivers text in a predetermined style for the purpose of information transfer, and thus, it is insufficient to perform a natural dialogue function required in the field of personal assistant agent or robot technology in recent years.

According to the above needs, a technology for providing various types of output speeches has recently been developed. In this case, however, a size of the TTS database is not only increased significantly according to the number of output speech types being provided but also does not cope with a user's intent exceeding an established range of the TTS database, user's feelings, or various context information.

Therefore, a technology capable of adjusting a style of an output speech reflecting various information including information included in a speech spoken by a user and sensing information and providing a customized TTS accordingly is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of providing a customized output speech reflecting acquired information in real time and a controlling method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a memory including at least one instruction and a processor connected to the memory to control the electronic device.

The processor may acquire text to respond on a received user's speech, acquire a plurality of parameter information for determining a style of an output speech corresponding to the text based on information on a type of a plurality of text-to-speech (TTS) databases and the received user's speech, identify a TTS database corresponding to the plurality of parameter information among the plurality of TTS databases, identify a weight set corresponding to the plurality of acquired parameter information among a plurality of weight sets acquired through a trained artificial intelligence model, adjust information on an output speech stored in the identified TTS database based on the identified weight set, synthesize an output speech based on the adjusted information on the output speech, and output an output speech corresponding to the text.

Here, the processor may acquire text corresponding to the user's speech by recognizing the received user's speech, acquire text to respond on the user's speech based on natural language processing for the text corresponding to the user's speech, and acquire at least one of the plurality of parameter information based on the text corresponding to the user's speech and the text for responding on the user's speech.

The processor may acquire information on an acoustic feature of the user's speech based on the user's speech and acquire at least one of the plurality of parameter information based on the acquired acoustic feature.

In accordance with another aspect of the disclosure, the plurality of parameter information is provided. The plurality of parameter information includes at least one of context information of the user and context information of the electronic device, and the processor may acquire at least one of the context information of the user and the context information of the electronic device based on sensing information acquired from a sensing device.

In accordance with another aspect of the disclosure, an electronic device is provided. The electronic device includes a user interface, wherein the processor may change at least one of the plurality of parameter information based on a user instruction input through the user interface.

In accordance with another aspect of the disclosure, the plurality of parameter information is provided. The plurality of parameter information includes at least one of information on a language of the output speech, information on a speaker of the output speech, information on a type of an application that provides information on the output speech, information on a tone of the output speech, information on a user's preference regarding the output speech, context information of the user, and context information of the electronic device.

In accordance with another aspect of the disclosure, the plurality of weight sets is provided. The plurality of weight sets includes a plurality of weights for adjusting information on output speeches stored in the plurality of TTS databases, respectively, and may be acquired by inputting a learning speech corresponding to the plurality of parameter information to the trained artificial intelligence model.

In accordance with another aspect of the disclosure, a method of controlling an electronic device is provided. The method includes acquiring text to respond on a received user's speech, acquiring a plurality of parameter information for determining a style of an output speech corresponding to the text based on information on a type of a plurality of text-to-speech (TTS) databases and the received user's speech, identifying a TTS database corresponding to the plurality of parameter information among the plurality of TTS databases, identifying a weight set corresponding to the plurality of acquired parameter information among a plurality of weight sets acquired through a trained artificial intelligence model, adjusting information on an output speech stored in the identified TTS database based on the identified weight set, synthesizing an output speech based on the adjusted information on the output speech, and outputting an output speech corresponding to the text.

In accordance with another aspect of the disclosure, a method of acquiring the text is provided. The method includes acquiring text corresponding to the user's speech by recognizing the received user's speech and acquiring text to respond on the user's speech based on natural language processing for the text corresponding to the user's speech, and the acquiring of the plurality of parameter information may include acquiring at least one of the plurality of parameter information based on the text corresponding to the user's speech and the text for responding on the user's speech.

The method may further include acquiring information on an acoustic feature of the user's speech based on the user's speech and acquiring at least one of the plurality of parameter information based on the acquired acoustic feature.

In accordance with another aspect of the disclosure, the plurality of parameter information is provided. The plurality of parameter information includes at least one of context information of the user and context information of the electronic device, and the acquiring of the plurality of parameter information may include acquiring at least one of the context information of the user and the context information of the electronic device based on sensing information acquired from a sensing device.

In accordance with another aspect of the disclosure, a method for acquiring the plurality of parameter information is provided. The method includes changing at least one of the plurality of parameter information based on an input user instruction.

In accordance with another aspect of the disclosure, the plurality of parameter information is provided. The plurality of parameter information includes at least one of information on a language of the output speech, information on a speaker of the output speech, information on a type of an application that provides information on the output speech, information on a tone of the output speech, information on a user's preference regarding the output speech, context information of the user, and context information of the electronic device.

In accordance with another aspect of the disclosure, the plurality of weight sets is provided. The plurality of weight sets includes a plurality of weights for adjusting information on output speeches stored in the plurality of TTS databases, respectively, and may be acquired by inputting a learning speech corresponding to the plurality of parameter information to the trained artificial intelligence model.

In accordance with another aspect of the disclosure, a computer-readable recording medium is provided. The computer-readable recording medium includes a program executing a method of controlling an electronic device, wherein the method of controlling an electronic device includes acquiring text to respond on a received user's speech, acquiring a plurality of parameter information for determining a style of an output speech corresponding to the text based on information on a type of a plurality of text-to-speech (TTS) databases and the received user's speech, identifying a TTS database corresponding to the plurality of parameter information among the plurality of TTS databases, identifying a weight set corresponding to the plurality of acquired parameter information among a plurality of weight sets acquired through a trained artificial intelligence model, adjusting information on an output speech stored in the identified TTS database based on the identified weight set, synthesizing an output speech based on the adjusted information on the output speech, and outputting an output speech corresponding to the text.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with reference to the accompanying drawings, in which:

FIG. 4B is a diagram specifically illustrating a process of acquiring a plurality of parameter information based on a user's speech according to an embodiment of the disclosure;

FIG. 6 is a flowchart illustrating a method of controlling an electronic device according to an embodiment of the disclosure;

FIG. 8 is a sequence diagram illustrating an embodiment in which a part of a control process is performed by a server connected to an electronic device according to an embodiment of the disclosure.

DETAILED DESCRIPTION

Figure 1:
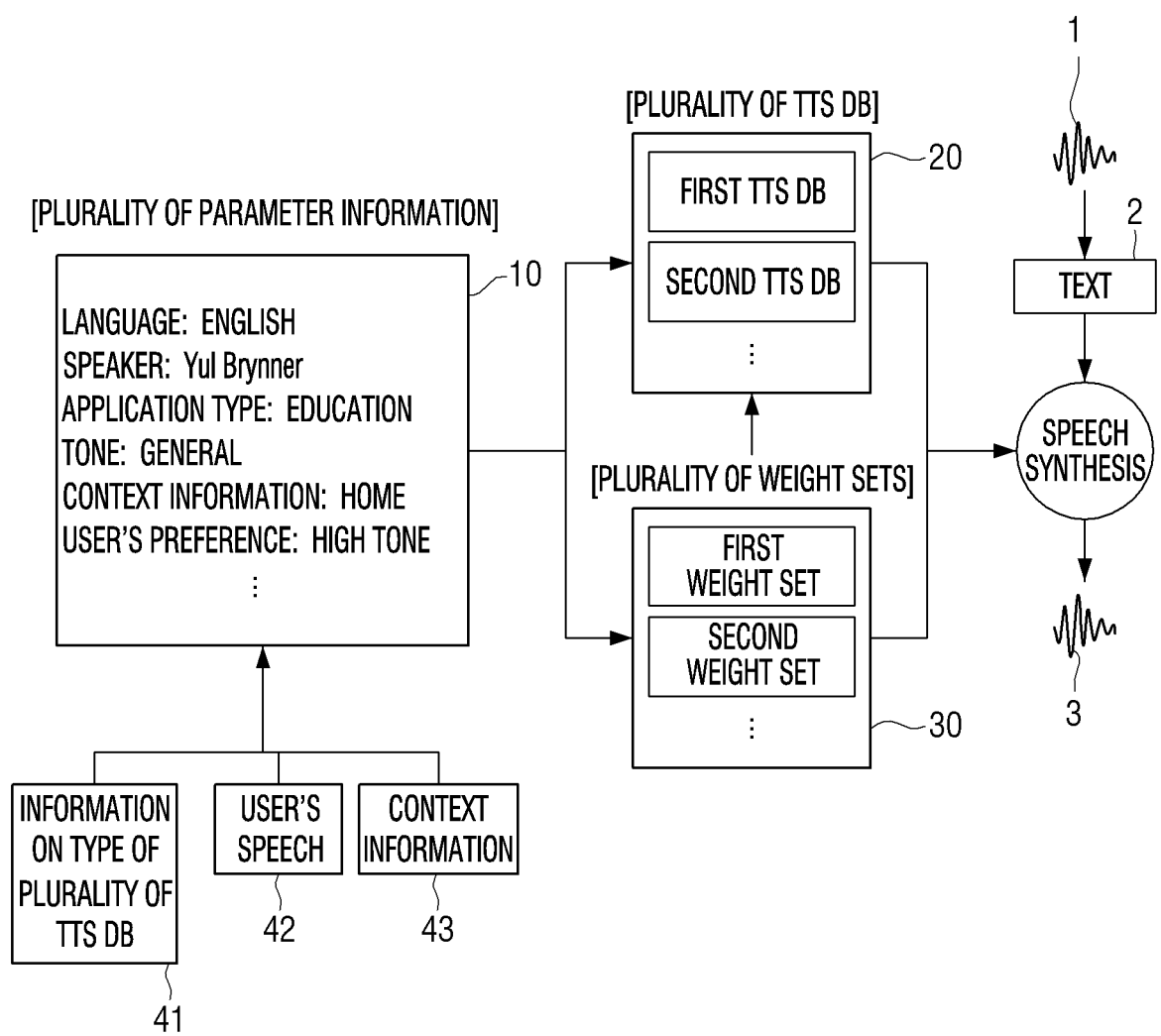
FIG. 1 is a diagram schematically illustrating a process of controlling an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Encryption/decryption may be applied to an information (data) transmission process performed in the t specification, and expressions for describing the information (data) transmission process in the specification and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B.

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the scope of the inventive concept are encompassed in the inventive concept. The same reference numbers are used throughout the drawings to refer to the same or like parts.

Further, in the following description, a detailed explanation of a publicly known technology related to the disclosure may be omitted when it is determined that the detailed explanation may unnecessarily obscure the subject matter of the disclosure.

The disclosure may be embodied in many different forms and should not be construed as being limited to the embodiments set forth herein; rather, these embodiments are provided so that this disclosure will be thorough and complete, and will fully convey the concept of the disclosure to those of ordinary skill in the art.

The terms used in the application are used to describe specific embodiments only and are not intended to limit the disclosure. A singular expression includes a plural expression as long as they are clearly distinguished in the context.

In this document, an expression such as "have," "may have," "comprise," or "may comprise" indicates existence of a corresponding characteristic (e.g., constituent element such as a numerical value, function, operation, or component) and does not exclude the presence of another characteristic.

In this document, an expression such as "A or B," "at least one of A or/and B," or "one or more of A or/and B" may include all possible combinations of together listed items. For example, "A or B," "at least one of A and B," or "one or more of A or B" may indicate all of (1) a case of including at least one A, (2) a case of including at least one B, and (3) a case of including both at least one A and at least one B.

An expression such as "first" and "second" used in this document may indicate various constituent elements regardless of order and/or importance, is used for distinguishing a constituent element from another constituent element, and does not limit corresponding constituent elements.

When it is described that a constituent element (e.g., a first constituent element) is "(operatively or communicatively) coupled with/to" or is "connected to" another constituent element (e.g., a second constituent element), it should be understood that the constituent element may be directly connected to the another constituent element or may be connected to the another constituent element through another constituent element (e.g., a third constituent element).

However, when it is described that a constituent element (e.g., a first constituent element) is "directly connected" or is "directly accessed" to another constituent element (e.g., a second constituent element), it may be understood that another constituent element (e.g., a third constituent element) does not exist between the constituent element and the other constituent element.

An expression "configured to" used in this document may be interchangeably used with, for example, "suitable for," "having the capacity to," "designed to," "adapted to," "made to," or "capable of" according to a situation. A term "configured to" does not always mean "specifically designed to" in hardware.

Alternatively, in any situation, an expression "device configured to" may mean that the device is "capable of" being configured together with another device or component. For example, a "processor configured to perform phrases A, B, and C" may be a generic-purpose processor (e.g., CPU or application processor) that executes an exclusive processor (e.g., an embedded processor) for performing a corresponding operation or at least one software program stored at a memory device to perform a corresponding operation.

In the description, the word "module" or "unit" refers to a software component, a hardware component, or a combination thereof, which is capable of carrying out at least one function or operation. A plurality of modules or units may be integrated into at least one module and implemented using at least one processor except for those modules or units that need to be implemented in specific hardware.

Meanwhile, various elements and regions in the drawings are schematically drawn. Therefore, the technical idea of the disclosure is not limited by a relative size or a distance drawn in the accompanying drawings.

Hereinafter, embodiments of the disclosure will be described in detail with reference to the accompanying drawings so that those skilled in the art to which the disclosure pertains may easily implement the disclosure.

FIG. 1 is a diagram schematically illustrating a process of controlling an electronic device according to an embodiment of the disclosure.

Referring to FIG. 1, an electronic device according to an embodiment of the disclosure may receive a user's speech 1 and acquire a text 2 for responding on the received user's speech 1. When the text 2 is acquired, the electronic device may output an output speech 3 corresponding to the acquired text 2.

However, prior to outputting the output speech, the electronic device according to the disclosure may adjust information on an output speech stored in a text-to-speech (TTS) database, synthesize an output speech based on the adjusted information on the output speech, and output the output speech corresponding to the acquired text.

Specifically, the electronic device may acquire a plurality of parameter information 10 for determining a style of the output speech corresponding to the acquired text based on information on a type of a plurality of TTS databases and a received user's speech 42.

Here, the plurality of parameter information 10 may include at least one of information on a language of the output speech, information on a speaker of the output speech, information on a type of an application that provides information on the output speech, information on a tone of the output speech, information on a user's preference regarding the output speech, context information of the user, or context information of the electronic device.

For example, the plurality of parameter information 10 may include at least one of information indicating that a language of the output speech is 'English', information indicating that a speaker of the output speech is 'Yul Brynner', information indicating that a type of an application providing information on the output speech is 'weather app', information indicating that a tone of the output speech is a 'heavy tone', information indicating that the user prefers an output speech having a 'high pitch', or information on a situation in which the user and the electronic device are at 'home'.

In addition, as described above, the style of the output speech corresponding to the same text may be differently determined according to the plurality of parameter information 10. For example, according to an embodiment of the disclosure, the same text 'Antwerp' may be output in speeches having different pronunciations such as 'Antwerp' and 'Antverpene' depending on whether a language of the output speech is "English" or "German."

In addition, the same text may be output as a 'calm style' speech and a 'friendly style' speech, respectively, depending on whether a speaker of the output speech is SON Seok-hee or YOU In-na, and the same text may be output as a 'serious style' and a 'pleasant style' respectively, depending on whether a type of the application providing information on the output speech is 'education app' or a 'quiz show'. In addition, when the user of the electronic device is a 'child', a speech of 'slow style' may be output according to a user's preference, and when the user of the electronic device is an 'elderly person', a 'high frequency signal-reinforced' speech may be output according to the user's preference, and different speeches may be output according to a situation in which the user and the electronic device are in.

However, the plurality of parameter information 10 according to the disclosure is not limited to the example as described above and may include various types of information within a range in which the purpose of the disclosure is achieved.

Hereinafter, a process of acquiring the plurality of parameter information 10 and outputting an output speech of a style corresponding to the acquired text based on the plurality of acquired parameter information 10 as described above will be described in detail.

As described above, the plurality of parameter information 10 may be acquired based on information 41 on the types of the plurality of TTS databases and the received user's speech 42.

Here, a plurality of TTS databases 20 refers to the entire set of databases in which information for converting the acquired text into output speech is stored. In addition, the information 41 on the types of the plurality of TTS databases refer to information on types of output speech that may be synthesized by the plurality of TTS databases 20. Specifically, the information 41 on the types of the plurality of TTS databases 20 may include information on languages and speakers of the plurality of TTS databases 20.

In addition, the information 41 on the types of the plurality of TTS databases may include information on an available field of the plurality of TTS databases. Here, the information on the available range of the plurality of TTS databases includes a range of styles which may be implemented by an output speech which may be synthesized by the corresponding TTS database.

In addition, the plurality of parameter information 10 may be determined within a limit of the types of the plurality of TTS databases which the electronic device may access. For example, the plurality of TTS databases may be configured to synthesize an output speech within a range limited to 'heavy tone' or 'normal tone' as a tone of the output speech. In this case, a 'sharp tone' may not be acquired as the information on the tone of the output speech among the plurality of parameter information.

Meanwhile, as described above, the plurality of parameter information 10 may be acquired based on the received user's speech. Specifically, the plurality of parameter information 10 may be acquired based on information acquired by recognizing the received user's speech and processing the recognized user's speech to a natural language.

Specifically, the electronic device may acquire text corresponding to the user's speech by recognizing the received user's speech, and acquire the text for responding to the user's speech based on natural language processing of the text corresponding to the user's speech. The electronic device may further acquire information on an acoustic feature of the user's speech, information on the meaning of the user's speech, information on the user's intent corresponding thereto, information on a response on the user's speech and a meaning thereof, and the like from the text corresponding to the user's speech and the text for responding to the user's speech.

The electronic device may acquire at least one of the plurality of parameter information 10 based on text corresponding to the user's speech, text for responding to the user's speech, and information acquired from the text.

For example, if the text corresponding to the user's speech is 'Tell me weather for tomorrow', the electronic device may acquire information of 'guide' as information on an that provides information on the output speech based on the fact that the user is inquiring about the weather tomorrow.

In the above example, if the text for responding to the user's speech is 'Heavy rain is expected tomorrow all day', the electronic device may obtain information of 'depressed tone' as information on a tone of an output speech based on the fact that tomorrow's weather is expected to be heavy rain all day.

In addition, the electronic device may acquire information on an acoustic feature of a user's speech based on the user's speech. The electronic device may acquire at least one of the plurality of parameter information 10 based on the acquired information on the acoustic feature.

Specifically, the electronic device may acquire information on the user's feeling based on the acquired information on the acoustic feature and acquire at least one of the plurality of parameter information 10 based on the acquired information on user's feeling.

For example, when information indicating that the user is 'furious' is acquired as information on the user's feeling based on the information on the acoustic feature of the user's speech, the electronic device may acquire information of 'calm tone' as information on a tone of an output speech based on the acquired information on the user's feeling.

A specific process of recognition of the received user's speech and natural language processing of the recognized user's speech will be described in detail with reference to FIG. 3.

Meanwhile, hereinabove, the case that the plurality of parameter information are acquired based on the information 41 on the type of the plurality of TTS databases and the received user's speech 42 is described, but according to another embodiment, the plurality of parameter information may also be acquired based on context information 43.

Here, the context information 43 may include sensing information detected by a sensor included in the electronic device or an external sensing device and information on a current state of the electronic device.

For example, the electronic device may acquire information indicating that the electronic device is at 'home' as context information of the electronic device among the plurality of parameter information based on location information of the electronic device based on global positioning system (GPS). In addition, the electronic device may acquire information of 'guide' as information on an application type that provides information on an output speech among the plurality of parameter information based on information on a state of the electronic device indicating that the electronic device is currently running a 'navigation app'.

Meanwhile, the information on the types of the plurality of TTS databases, the user's speech, and the context information as described above may be acquired in real time, and accordingly, the style of the output speech may be changed in real time. Specifically, when at least one of the information on the types of the plurality of TTS databases, the user's speech, and the context information is changed, at least one of the plurality of parameter information may be changed accordingly. When the at least one of the plurality of parameter information is changed, the TTS database and weight set corresponding to the plurality of parameter information are changed, and thus, the style of the output speech corresponding to the text may also be changed.

For example, when the user of the electronic device is a 'child', the electronic device may acquire information on a user preference for an output speech and a tone of the output speech among the plurality of parameter information based on information on an acoustic feature of the user's speech and information on an image of the user acquired through a camera, and output an output speech of 'slow style' accordingly.

In this case, when it is determined that a meaning of a specific sentence is important as a result of speech recognition of a specific sentence for responding to the received user's speech, the electronic device may change the information on the tone of the output speech among the plurality of parameter information into 'pleasant style' in real time. Accordingly, the electronic device may output the output speech of 'slow style', output the output speech of 'pleasant style' for the specific sentence determined to be important, and then output the output speech of 'slow style' again for the sentence following the specific sentence determined to be important.

In addition, in the above example, the electronic device may acquire information indicating that the user closes the eyes for a predetermined time by performing object recognition based on the image acquired through the camera, and thus the electric device may acquire context information indicating that the user does not pay attention. In this case, the electronic device may output the output speech of 'pleasant style' until context information indicating that the user is paying attention again.

Meanwhile, hereinabove, the embodiment of the case in which it is determined that the meaning of the specific sentence is important as a result of the speech recognition of the specific sentence for responding to the received user's speech is described, but the electronic device may also determine importance of a word, phrase, or clause which are components included in a specific sentence as a result of speech recognition regarding a specific sentence for responding to a received user's speech and output a changed style of an output speech accordingly in real time.

For example, if a received user's speech is "Where is my doll?" and a sentence for responding to the received user's speech is "Doll is on the couch", the electronic device may determine that "On the couch" included in the sentence for responding to the user's speech is important for response, and thus, the electronic device may output "Doll" in an output speech of 'pleasant style', output "On the couch" in an output speech of 'slow style', and "is" in an output speech of pleasant style again.

Meanwhile, at least one of the plurality of parameter information may be set or changed by the user. If it is difficult to acquire at least one of the plurality of parameter information based on the information on the types of the plurality of TTS databases and the received user's speech and the context information, the plurality of parameter information may be acquired by regarding information set by the user as a default value.

For example, if information of 'Korean' as a language of an output speech and 'YOU In-na' as a speaker of the output speech are previously determined by the user and if it is not possible to acquire other information on the language of the output speech and the speaker of the output speech among the plurality of parameter information based on the information on the types of the plurality of TTS databases and the received user's speech and context information, the electronic device may acquire the information of "Korean" as the language of the output speech and 'YOU In-na' as the speaker of the output speech among the plurality of parameter information. In addition, the plurality of parameter information may be acquired based on various information that may be acquired by the electronic device within a range in which the purpose of the disclosure is achieved.

Meanwhile, as described above, in case that at least two of the information on the types of the plurality of TTS databases, the received user's speech, and the context information of the electronic device are in conflict with each other, which of the information is to be given priority may vary in an implementation example according to various embodiments of the disclosure.

In particular, according to an embodiment of the disclosure, when there is a conflict between the user's speech and the context information, at least one of the plurality of parameter information may be acquired preferentially in consideration of the user's speech including information on a user's intent and user's feeling rather than the context information.

For example, although information indicating that a 'text message app' is running is acquired as context information, if information indicating that an application providing information on an output speech is 'navigation app' based on information on the user's speech is acquired, the electronic device may acquire information called "guide" as information on a type of the application that provides information on the output speech among the plurality of parameter information.

Meanwhile, as described above, even when the user's speech is considered preferentially over the context information of the electronic device, it cannot go beyond the information on the type of the plurality of TTS databases, in particularly, the range of information on an available field of the plurality of TTS databases. However, when the TTS database that the electronic device may access is updated, the available field of the plurality of TTS databases may also be expanded.

As described above, when the plurality of parameter information 10 is acquired, the electronic device may identify a TTS database corresponding to the plurality of acquired parameter information among the plurality of TTS databases 20.

For example, when information indicating that the language of the output speech is 'English' and information indicating that the speaker is "Yul Brynner" among the plurality of parameter information 10 is acquired, the electronic device may identify a TTS database corresponding to a spoken speech of 'English' of 'Yul Brynner' among the plurality of TTS databases.

Meanwhile, when the plurality of parameter information 10 is acquired, the electronic device may identify a weight set corresponding to the plurality of parameter information 10 acquired from a plurality of weight sets 30 acquired through the trained artificial intelligence model.

Here, the plurality of weight sets 30 may each include a plurality of weights for adjusting the information on the output speech stored in the plurality of TTS databases. The plurality of weight sets 30 may be acquired by inputting a learned speech corresponding to the plurality of parameter information to the trained artificial intelligence model.

Specifically, the plurality of weights included in each of the plurality of weight sets 30 indicate a contribution to each of a plurality of factors which may determine a style of the output speech. For example, a first weight among a plurality of weights included in each of the plurality of weight sets 30 may indicate a contribution to a speech speed of the output speech, and a second weight among the plurality of weights may indicate a contribution to a pitch of the output speech.

Meanwhile, because the plurality of weight sets are acquired through the trained artificial intelligence model, when the TTS database used for learning the artificial intelligence model is changed, the plurality of weight sets acquired through the artificial intelligence model may also be changed.

For example, if the speaker of the TTS database used for learning the artificial intelligence model is 'SON Seok-hee', {0.2, 0.1, 0.3, 0.4} may be acquired as a set of a plurality of weights corresponding to certain elements A, B, C, and D related respectively to the plurality of different factors that may determine the style of the output speech, and if the speaker of the TTS database is 'YOU In-na', {0.3, 0.1, 0.7, 0.3} may be acquired as a set of a plurality of weights respectively corresponding to the certain elements A, B, C, and D.

In addition, because an electronic device 100 according to the disclosure identifies a weight set corresponding to the plurality of parameter information acquired from the plurality of weight sets acquired through the trained artificial intelligence model, if the TTS database that the electronic device 100 may access is changed, the weight set corresponding to the plurality of acquired parameter information among the plurality of weight sets acquired through the trained artificial intelligence model may also be changed.

For example, although the plurality of same parameter information is acquired based on the information on the types of the plurality of TTS databases, the user's speech, and the like, if the TTS database that the electronic device 100 may access is changed from 'SON Seok-hee' to 'YOU In-na', a weight set {0.3, 0.1, 0.7, 0.3} which may be acquired when the speaker of the TTS database is 'YOU In-na', rather than a weight set {0.2, 0.1, 0.3, 0.4} which may be acquired when the speaker of the TTS database is 'SON Seok-hee', may be identified as a weight set corresponding to the plurality of acquired parameter information among the plurality of weight sets.

Details of the artificial intelligence model for acquiring the plurality of weight sets 30 will be described later with reference to FIGS. 5A and 5B.

When the weight set is identified, the electronic device may adjust information on the output speech stored in the identified TTS database based on the identified weight set. Specifically, the electronic device may adjust the information on the output speech stored in the identified TTS database according to a contribution of each weight to each of a plurality of factors that may determine the style of the output speech based on the identified weight set.

When the information on the output speech is adjusted, the electronic device may synthesize the output speech based on the adjusted information on the output speech and output an output speech corresponding to the acquired text.

Details of the artificial intelligence model for synthesizing the output speech will be described later with reference to FIGS. 5A and 5B.

According to an embodiment of the disclosure as described above, the electronic device may provide a customized output speech by reflecting various kinds of information including information included in a speech spoken by the user and sensing information in real time.

Accordingly, by adaptively adjusting the style of the output speech based on the acquired information, an interactive TTS necessary in a robot or next generation agent technology field may be implemented.

Figure 2A:
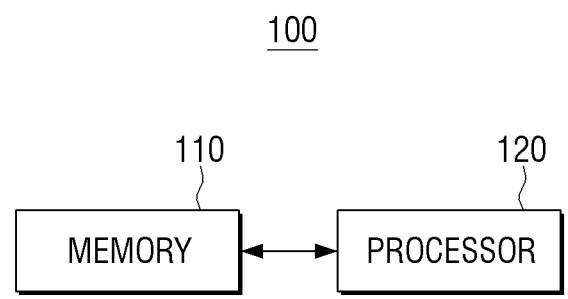
FIG. 2A is a block diagram schematically illustrating a configuration of an electronic device according to an embodiment of the disclosure.

FIG. 2A is a block diagram schematically illustrating a configuration of an electronic device according to an embodiment of the disclosure.

Figure 2B:
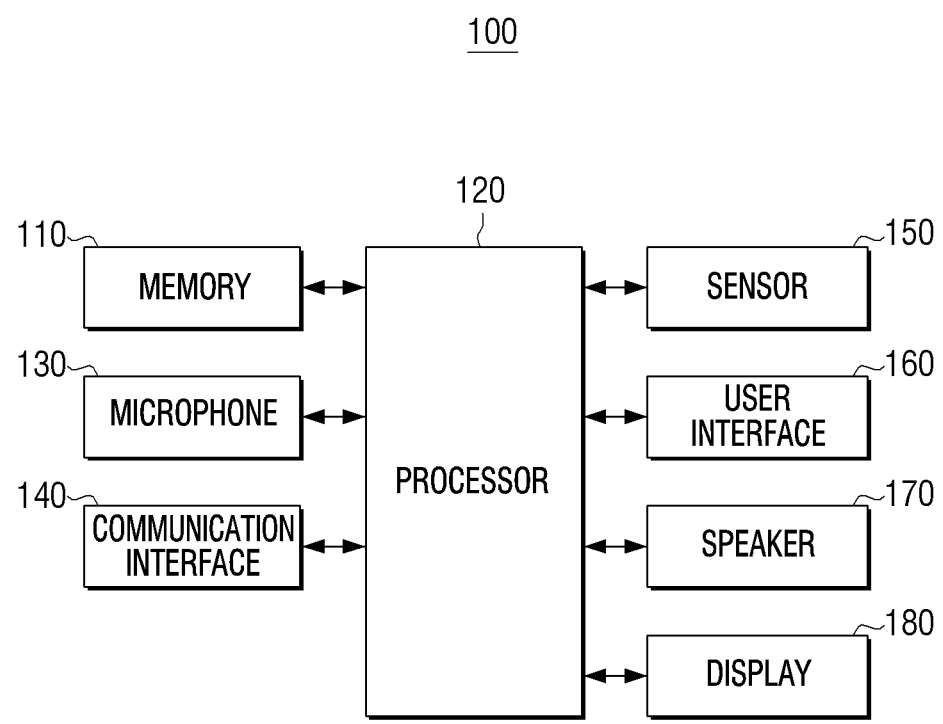
FIG. 2B is a block diagram illustrating a specific configuration of an electronic device according to an embodiment of the disclosure.

FIG. 2B is a block diagram specifically illustrating a configuration of an electronic device according to an embodiment of the disclosure.

Referring to FIG. 2A, the electronic device 100 according to an embodiment of the disclosure includes a memory 110 and a processor 120. As illustrated in FIG. 2B, the electronic device 100 according to an embodiment of the disclosure may further include a microphone 130, a communication interface 140, a sensor 150, a user interface 160, and a speaker 170, a display 180, or the like.

However, such components are examples, and in the disclosure, a new component may be added or some of the components may be omitted.

At least one instruction regarding the electronic device 100 may be stored in the memory 110. In addition, an operating system (O/S) for driving the electronic device 100 may be stored in the memory 110. In addition, the memory 110 may store various software programs or applications for operating the electronic device 100 according to various embodiments of the disclosure. The memory 110 may include a semiconductor memory such as a flash memory or the like and a magnetic storage medium such as a hard disk or the like.

Specifically, various software modules for operating the electronic device 100 according to various embodiments of the disclosure may be stored in the memory 110, and the processor 120 may control an operation of the electronic device 100 by executing various software modules stored in the memory 110. That is, the memory 110 may be accessed by the processor 120, and data reading/recording/correcting/deleting/updating by the processor 120 may be performed on the memory 110.

Meanwhile, in the disclosure, the term of memory may be used to include a memory, a read only memory (ROM) (not shown) or a random access memory (RAM) (not shown) of the processor 120, or a memory card (not shown) (e.g., micro SD card, a memory stick) installed in the electronic device 100.

In particular, in various embodiments of the disclosure, a plurality of TTS databases and a plurality of weight sets may be stored in the memory 110, and speech data, text data, and a plurality of parameter information according to various embodiments of the disclosure may be stored in the memory 110.

In addition, the artificial intelligence model as described below may be implemented in software and stored in the memory 110, and the processor 120 may execute the software stored in the memory 110 to control speech recognition and speech synthesis process according to the disclosure.

The processor 120 controls the overall operation of the electronic device 100. Specifically, the processor 120 is connected to the configuration of the electronic device 100 including the microphone 130 and the memory 110 as described above to control the overall operation of the electronic device 100.

The processor 120 may be implemented in various ways. For example, the processor 120 may be implemented as at least one of an application specific integrated circuit (ASIC), an embedded processor, a microprocessor, hardware control logic, a hardware finite state machine (FSM), and a digital signal processor (DSP).

Meanwhile, in the disclosure, the term of processor may be used to include a central processing unit (CPU), a graphic processing unit (GPU), a main processing unit (MPU), and the like.

In particular, according to an embodiment of the disclosure, the processor 120 may acquire text for responding to a received user's speech. When the text is acquired, the processor 120 may output an output speech corresponding to the acquired text.

However, prior to outputting the output speech, the processor 120 according to the disclosure may adjust information on the output speech stored in the text-to-speech (TTS) database, synthesize the output speech based on the adjusted information on the output speech, and output an output speech corresponding to the acquired text.

Hereinafter, controlling speech recognition and speech synthesis process by the processor 120 according to the disclosure will be described in detail.

Specifically, the processor 120 may acquire a plurality of parameter information for determining the style of the output speech corresponding to the acquired text based on the information on the type of the plurality of TTS databases and the received user's speech.

Here, the plurality of parameter information may include information on a language of the output speech, information on a speaker of the output speech, information on a type of an application that provides information on the output speech, information on a tone of the output speech, information on a user's preference regarding the output speech, context information of the user, context information of the electronic device 100, and the like.

For example, the plurality of parameter information may include information indicating that a language of the output speech is 'English', information indicating that a speaker of the output speech is 'Yul Brynner', information indicating that a type of an application providing information on the output speech is 'weather app', information indicating that a tone of the output speech is a 'heavy tone', information indicating that the user prefers an output speech having a 'high pitch', information on a situation in which the user and the electronic device 100 are at 'home', and the like.

In addition, as described above, the style of the output speech corresponding to the same text may be differently determined according to the plurality of parameter information 10. For example, according to an embodiment of the disclosure, the same text 'Antwerp' may be output in speeches having different pronunciations such as 'Antwerp' and 'Antverpene' depending on whether a language of the output speech is "English" or "German."

In addition, the same text may be output as a speech of a 'calm style' and a speech of a 'friendly style' depending on whether a speaker of the output speech is SON Seok-hee or YOU In-na, and the same text may be output as a speech of a 'serious style' and a speech of a 'pleasant style' depending on whether a type of the application providing information on the output speech is 'education app' or a 'quiz show'. In addition, when the user of the output speech is a 'child', a speech of a 'slow style' may be output according to the user's preference, and when the user of the output speech is an 'elderly person', a 'high frequency signal-reinforced' speech may be output according to the user's preference, and different speeches of voicing may be output according to a situation in which the user and the electronic device are in.

However, the parameter information according to the disclosure is not limited to the example as described above and may include various types of information within a range in which the purpose of the disclosure is achieved.

Hereinafter, a process of acquiring the plurality of parameter information 10 and outputting an output speech of a style corresponding to the acquired text based on the plurality of acquired parameter information 10 as described above will be described in detail.

Meanwhile, as described above, the plurality of parameter information may be acquired based on the information on the types of the plurality of TTS databases and the received user's speech.

The plurality of TTS databases refer to the entire set of data in which information for converting the acquired text into output speech is stored. In addition, the information on the types of the plurality of TTS databases refer to information on types of output speech that may be synthesized by the plurality of TTS databases. Specifically, the information on the types of the plurality of TTS databases may include information on languages and speakers of the plurality of TTS databases.

In addition, the information on the types of the plurality of TTS databases may include information on an available field of the plurality of TTS databases. Here, the information on the available field of the plurality of TTS databases includes a range of styles which may be implemented by an output speech which may be synthesized by the corresponding TTS database.

In addition, the plurality of parameter information may be determined within a limit of the types of the plurality of TTS databases which the electronic device 100 may access. For example, the plurality of TTS databases may be configured to synthesize an output speech within a range limited to 'heavy tone' or 'normal tone' as a tone of the output speech. In this case, a 'sharp tone' may not be acquired as the information on the tone of the output speech among the plurality of parameter information.

Meanwhile, as described above, the plurality of parameter information may be acquired based on the received user's speech. Specifically, the plurality of parameter information may be acquired based on information acquired by recognizing the received user's speech and processing the recognized user's speech to a natural language.

Specifically, the processor 120 may acquire text corresponding to the user's speech by recognizing the received user's speech, and acquire the text for responding to the user's speech based on natural language processing of the text corresponding to the user's speech. The processor 120 may acquire information on an acoustic feature of the user's speech, information on the meaning of the user's speech, information on the user's intent corresponding thereto, information on a response on the user's speech and a meaning thereof, and the like from the text corresponding to the user's speech and the text for responding to the user's speech.

The processor 120 may acquire at least one of the plurality of parameter information based on text corresponding to the user's speech and text for responding to the user's speech.

For example, if the text corresponding to the user's speech is 'Tell me weather for tomorrow', the processor 120 may acquire information of 'guide' as information on an that provides information on the output speech based on the fact that the user is inquiring about the weather tomorrow.

In the above example, if the text for responding to the user's speech is 'Heavy rain is expected tomorrow all day', the processor 120 may obtain information of 'depressed tone' as information on a tone of an output speech based on the fact that tomorrow's weather is expected to be heavy rain all day.

In addition, the processor 120 may acquire information on an acoustic feature of a user's speech based on the user's speech. The processor 120 may acquire at least one of the plurality of parameter information based on the acquired information on the acoustic feature.

Specifically, the processor 120 may acquire information on the user's feeling based on the acquired information on the acoustic feature and acquire at least one of the plurality of parameter information based on the acquired information on user's feeling.

For example, when information indicating that the user is 'furious' is acquired based on the information on the acoustic feature of the user's speech, the processor 120 may acquire information of 'calm tone' as information on a tone of an output speech based on the acquired information on the user's feeling.

A specific process of recognition of the received user's speech and natural language processing of the recognized user's speech will be described in detail later with reference to FIG. 3.

Meanwhile, hereinabove, the case that the plurality of parameter information are acquired based on the information on the type of the plurality of TTS databases and the received user's speech is described, but according to another embodiment, the plurality of parameter information may also be acquired based on the context information 43.

Here, the context information 43 may include sensing information detected by the sensor 150 included in the electronic device 100 or an external sensing device and information on a current state of the electronic device.

For example, the processor 120 may acquire information indicating that the electronic device is at 'home' as context information of the electronic device among the plurality of parameter information based on location information of the electronic device based on global positioning system (GPS). In addition, the processor 120 may acquire information of 'guide' as information on an application type that provides information on an output speech among the plurality of parameter information based on information on a state of the electronic device indicating that the electronic device is currently running a 'navigation app'.

Meanwhile, the information on the types of the plurality of TTS databases, the user's speech, and the context information as described above may be acquired in real time, and accordingly, the style of the output speech may be changed in real time. Specifically, when at least one of the information on the types of the plurality of TTS databases, the user's speech, and the context information is changed, at least one of the plurality of parameter information may be changed accordingly. When the at least one of the plurality of parameter information is changed, the TTS database and weight set corresponding to the plurality of parameter information are changed, and thus, the style of the output speech corresponding to the text may also be changed.

For example, when the user of the electronic device is a 'child', the processor 120 may acquire information on a user preference for an output speech and a tone of the output speech among the plurality of parameter information based on information on an acoustic feature of the user's speech and information on an image of the user acquired through a camera, and output an output speech of 'slow style' accordingly.

In this case, when it is determined that a meaning of a specific sentence is important as a result of speech recognition of a specific sentence for responding to the received user's speech, the processor 120 may change the information on the tone of the output speech among the plurality of parameter information into 'pleasant style' in real time. Accordingly, the processor 120 may output the output speech of 'slow style', output the output speech of 'pleasant style' for the specific sentence determined to be important, and then output the output speech of 'slow style' again for the sentence following the specific sentence determined to be important.

In addition, in the above example, the processor 120 may acquire information indicating that the user closes the eyes for a predetermined time by performing object recognition based on the image acquired through the camera, and thus the processor 120 may acquire context information indicating that the user does not pay attention. In this case, the processor 120 may output the output speech of 'pleasant style' until context information indicating that the user is paying attention again.

Meanwhile, hereinabove, the embodiment of the case in which it is determined that the meaning of the specific sentence is important as a result of the speech recognition of the specific sentence for responding to the received user's speech is described, but the processor 120 may also determine importance of a word, phrase, or clause which are a component included in a specific sentence as a result of speech recognition for responding to a received user's speech and output a changed style of an output speech accordingly in real time.

For example, if a received user's speech is "Where is my doll?" and a sentence for responding to the received user's speech is "Doll is on the couch", the processor 120 may determine that "On the couch" included in the sentence for responding to the user's speech is important for response, and thus, the electronic device may output "Doll" in an output speech of 'pleasant style', output "On the couch" in an output speech of 'slow style', and "is" in an output speech of pleasant style again.

Meanwhile, at least one of the plurality of parameter information may be set or changed by the user. If it is difficult to acquire at least one of the plurality of parameter information based on the information on the types of the plurality of TTS databases and the received user's speech and the context information, the plurality of parameter information may be acquired by regarding information set by the user as a default value.

For example, if information of 'Korean' as a language of an output speech and 'YOU In-na' as a speaker of the output speech are previously determined by the user and if it is not possible to acquire other information on the language of the output speech and the speaker of the output speech among the plurality of parameter information based on the information on the types of the plurality of TTS databases and the received user's speech and context information, the processor 120 may acquire the information of "Korean" as the language of the output speech and 'YOU In-na' as the speaker of the output speech among the plurality of parameter information.

In addition, the plurality of parameter information may be acquired based on various information that may be acquired by the electronic device 100 within a range in which the purpose of the disclosure is achieved.

Meanwhile, as described above, in case that at least two of the information on the types of the plurality of TTS databases, the received user's speech, and the context information of the electronic device are in conflict with each other, which of the information is to be given priority may vary in an implementation example according to various embodiments in the disclosure.

In particular, according to an embodiment of the disclosure, when there is a conflict between the user's speech and the context information, at least one of the plurality of parameter information may be acquired preferentially in consideration of the user's speech including information on a user's intent and user's feeling rather than the context information.

For example, although information indicating that a 'text message app' is running is acquired as context information, if information indicating that an application providing information on an output speech is 'navigation app' based on information on the user's speech is acquired, the processor 120 may acquire information called "guide" as information on a type of the application that provides information on the output speech among the plurality of parameter information.

Meanwhile, as described above, even when the user's speech is considered preferentially over the context information of the electronic device, it cannot go beyond the information on the type of the plurality of TTS databases, in particularly, the range of information on an available field of the plurality of TTS databases. However, when the TTS database that the electronic device may access is updated, the available field of the plurality of TTS databases may also be expanded.

As described above, when the plurality of parameter information is acquired, the processor 120 may identify a TTS database corresponding to the plurality of acquired parameter information among the plurality of TTS databases.

For example, when information indicating that the language of the output speech is 'English' and information indicating that the speaker of the output speech is "Yul Brynner" among the plurality of parameter information is acquired, the processor 120 may identify a TTS database corresponding to a spoken speech of 'English' of 'Yul Brynner' among the plurality of TTS databases.

Meanwhile, when the plurality of parameter information is acquired, the processor 120 may identify a weight set corresponding to the plurality of parameter information acquired from the plurality of weight sets acquired through the trained artificial intelligence model.

Here, the plurality of weight sets may each include a plurality of weights for adjusting the information on the output speech stored in the plurality of TTS databases. The plurality of weight sets may be acquired by inputting a learned speech corresponding to the plurality of parameter information to the trained artificial intelligence model.

Specifically, the plurality of weights included in each of the plurality of weight sets indicate a contribution to each of a plurality of factors which may determine a style of the output speech. For example, a first weight among a plurality of weights included in each of the plurality of weight sets may indicate a contribution to a speech speed of the output speech, and a second weight among the plurality of weights may indicate a contribution to a pitch of the output speech.

Meanwhile, because the plurality of weight sets are acquired through the trained artificial intelligence model, when the TTS database used for learning the artificial intelligence model is changed, the plurality of weight sets acquired through the artificial intelligence model may also be changed.

For example, if the speaker of the TTS database used for learning the artificial intelligence model is 'SON Seok-hee', {0.2, 0.1, 0.3, 0.4} may be acquired as a set of a plurality of weights corresponding to certain elements A, B, C, and D related respectively to the plurality of different factors that may determine the style of the output speech, and if the speaker of the TTS database is 'YOU In-na', {0.3, 0.1, 0.7, 0.3} may be acquired as a set of a plurality of weights respectively corresponding to the certain elements A, B, C, and D.

In addition, because the processor 120 according to the disclosure identifies a weight set corresponding to the plurality of parameter information acquired from the plurality of weight sets acquired through the trained artificial intelligence model, if the TTS database that the processor 120 may access is changed, the weight set corresponding to the plurality of acquired parameter information among the plurality of weight sets acquired through the trained artificial intelligence model may also be changed.

For example, although the plurality of same parameter information is acquired based on the information on the types of the plurality of TTS databases, the user's speech, and the like, if the TTS database that the processor 120 may access is changed from 'SON Seok-hee' to 'YOU In-na', a weight set {0.3, 0.1, 0.7, 0.3} which may be acquired when the speaker of the TTS database is 'YOU In-na', rather than a weight set {0.2, 0.1, 0.3, 0.4} which may be acquired when the speaker of the TTS database is 'SON Seok-hee', may be identified as a weight set corresponding to the plurality of acquired parameter information among the plurality of weight sets.

Details of the artificial intelligence model for acquiring the plurality of weight sets will be described later with reference to FIGS. 5A and 5B.

When the weight set is identified, the processor 120 may adjust information on the output speech stored in the identified TTS database based on the identified weight set. Specifically, the processor 120 may adjust the information on the output speech stored in the identified TTS database according to a contribution of each weight to each of a plurality of factors that may determine the style of the output speech based on the identified weight set.

Also, when the information on the output speech is adjusted, the processor 120 may synthesize the output speech based on the adjusted information on the output speech and output an output speech corresponding to the acquired text.

Details of the artificial intelligence model for synthesizing the output speech will be described later with reference to FIGS. 5A and 5B.

The microphone 130 may receive a user's speech. Specifically, the microphone 130 converts a sound signal according to the user's speech into an electrical signal.

In particular, in various embodiments of the disclosure, the microphone 130 may receive a user's speech according to user's speech, and here, the received user's speech may correspond to a control command for controlling an operation of the electronic device 100.

The communication interface 140 communicates with an external device (not shown) or a server (not shown). In addition, the communication interface 140 may include at least one of a Wi-Fi chip, a Bluetooth chip, a wireless communication chip, or a near field communication (NFC) chip.

In particular, in various embodiments according to the disclosure, the communication interface 140 may be communicatively connected to the external device (not shown) or the server (not shown) to receive a user speech signal from the external device (not shown) or the server (not shown). That is, the user's speech as described above may not only be received through the microphone 130 but also be received through the communication interface 140.

Meanwhile, according to an embodiment of the disclosure, the processor 120 may determine whether the electronic device 100 and the external device (not shown) are communicatively connected to each other through the communication interface 140 and acquire context information of the electronic device 100 and the user based on whether the electronic device 100 and the external device (not shown) are communicatively connected to each other. Also, the processor may acquire at least one of the plurality of parameter information based on the acquired context information of the electronic device 100 and the user.

The sensor 150 may detect various types of information. Specifically, the sensor 150 may be a touch sensor that detects a user's touch. In addition, the electronic device 100 according to the disclosure may include various sensors such as a motion sensor, a temperature sensor, a humidity sensor, an illumination sensor, and the like.

In particular, in various embodiments of the disclosure, the processor 120 may acquire at least one of the plurality of parameter information based on various types of sensing information detected by the sensor 150.

Specifically, the plurality of parameter information includes at least one of context information of the user and context information of the electronic device 100, and the processor 120 may acquire at least one of the context information of the user and context information of the electronic device 100 based on sensing information acquired from the sensor 150.

For example, the processor 120 may acquire context information indicating that the user came 'home' based on information on the user's movement acquired from the motion sensor. In addition, the processor 120 may acquire information of 'light tone' as the information on a tone of an output speech based on the information on the user's movement acquired from the temperature sensor.

Meanwhile, hereinabove, the case that the sensor 150 is included in the electronic device 100 has been described. However, the sensor 150 as described above may also be implemented as a sensing device which is a separate external device.

The user interface 160 receives a user interaction for controlling the overall operation of the electronic device 100. Specifically, the user interface 160 may include a camera, the microphone 130, a remote control signal receiver, or the like. Meanwhile, the user interface 160 may be implemented in a form included in the display 180 as a touch screen. Because the microphone 130 is specified as a separate component and described above, a redundant description thereof will be omitted.

In particular, in various embodiments of the disclosure, the processor 120 may set or change at least one of the plurality of parameter information based on a user instruction input through the user interface 160.

That is, the plurality of parameter information may be acquired based on various information such as information on types of the plurality of TTS databases, received user's speech and sensing information, but the plurality of acquired parameter information may be changed by a user instruction through the user interface 160.

The speaker 170 may output a speech. In addition, the processor 120 may control the speaker 170 to output a speech. In particular, in various embodiments of the disclosure, the speaker 170 may output an output speech corresponding to acquired text.

The display 180 may output an image. In addition, the processor 120 may control the display 180 to output an image. In particular, in an embodiment of the disclosure, the processor 120 may control the display 180 to display text information corresponding to the output speech according to the disclosure.

According to various embodiments of the disclosure as described above, the electronic device 100 may provide a customized output speech reflecting various information including information included in a speech spoken by the user and sensing information in real time.

Accordingly, by adaptively adjusting a style of the output speech based on the acquired information, an interactive TTS required in the robot or next generation agent technology field may be implemented.

Figure 3:
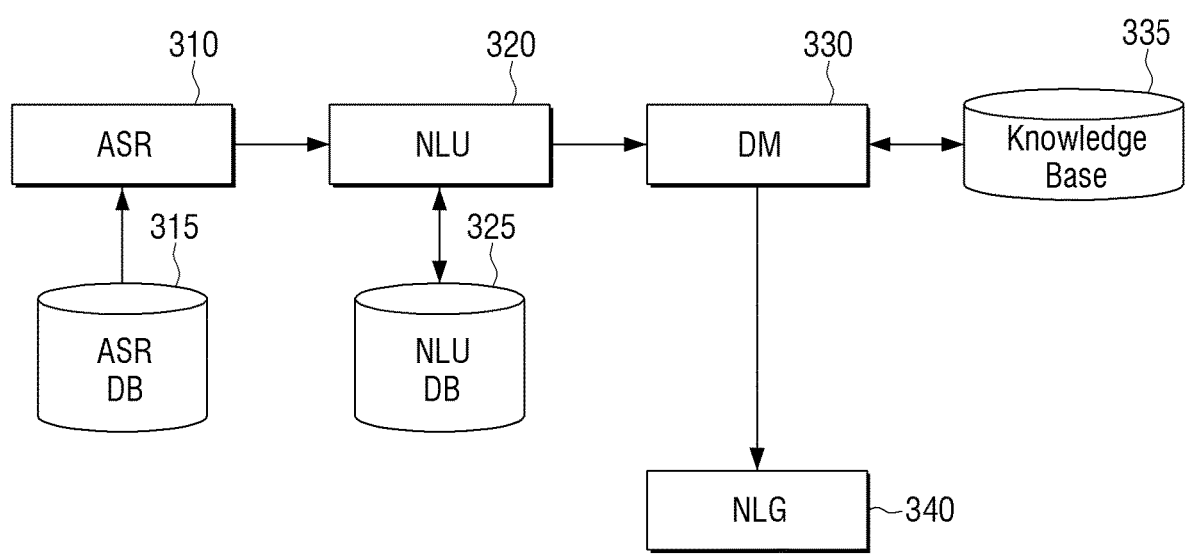
FIG. 3 is a diagram specifically illustrating a speech recognition process according to an embodiment of the disclosure.

FIG. 3 is a diagram specifically illustrating a speech recognition process according to an embodiment of the disclosure.

The speech recognition process according to an embodiment of the disclosure may be performed through an artificial intelligence agent system as shown in FIG. 3. According to an embodiment of the disclosure, the speech recognition system may be stored in the memory 110 of the electronic device 100. However, this is merely an example, and at least one included in the speech recognition system may be included in at least one external server.

Referring to FIG. 3, the speech recognition system may include an automatic speech recognition (ASR) module 310, a natural language understanding (NLU) module 320, and a dialogue manager (DM) module 330, and a natural language generator (NLG) module 340. In addition, the speech recognition system may further include a path planner module or an action planner module.

The ASR module 310 may convert the user's speech received from the electronic device 100 into text data. The ASR module 310 may include a speech recognition module, and the speech recognition module may include an acoustic model and a language model. In particular, the acoustic model may acquire information on acoustic features of the user's speech.

Specifically, the acoustic model may include information related to voicing, and the language model may include unit phoneme information and information on a combination of unit phoneme information. Also, the speech recognition module may convert a user's speech into text data using information related to voicing and information related to unit phoneme information. Information on the acoustic model and the language model may be stored in an automatic speech recognition database (ASR DB) 315, for example.

If information on an acoustic feature of the user's speech is acquired based on the ASR module 310, in particular, the acoustic model as described above, the ASR module 310 may acquire information on a user's feeling based on the information on the acquired acoustic feature of the user's speech.

For example, the ASR module 310 may input information on user acoustic features to an artificial intelligence model including a convolutional neural network (CNN) and acquire information on the user's feeling using a method of classifying factors of feeling included in the user's speech or the like.

The NLU module 320 may recognize user intent by performing syntactic analysis or semantic analysis.

The NLU module 320 may divide a user input into grammatical units (e.g., words, phrases, morphemes, etc.) and perform grammatical analysis by recognizing which grammatical elements the divided units have.

The NLU module 320 may perform semantic analysis using semantic matching, rule matching, formula matching, and the like. Accordingly, the NLU module 320 may acquire a parameter (or slot) necessary for the user input to express a domain or intent.

The NLU module 320 may determine a user's intent and a parameter using a matching rule divided into a domain, an intent, and a parameter necessary for recognizing an intent. For example, one domain (e.g., alarm) may include a plurality of intents (e.g., alarm setting, alarm off, etc.), and one intent may include a plurality of parameters (e.g., time, number of repetitions, alarm sounds, etc.). In addition, the plurality of rules may include one or more essential element parameters. Meanwhile, the matching rule may be stored in an NLU database (NLU DB) 325.

The NLU module 320 recognizes a meaning of words extracted from a user input using linguistic features (e.g., grammatical elements) such as morphemes and phrases and matches the recognized meaning of the words to a domain and an intent to determine the user's intent.

For example, the NLU module 320 may determine a user's intent by calculating how many words extracted from the user input are included in each domain and each intent. According to an embodiment of the disclosure, the NLU module 320 may determine a parameter of the user input using a word used a basis for identifying an intent.

In addition, the NLU module 320 may determine the intent of the user using the NLU DB 325 in which linguistic features are stored to recognize the intent of the user input.

The NLU module 320 may generate a path rule based on the intent and the parameter of the user input. For example, the NLU module 320 may select an application to be run based on the intent of the user input and determine an operation to be performed in the selected application.

The NLU module 320 may generate a path rule by determining a parameter corresponding to the determined operation. According to an embodiment, the path rule generated by the NLU module 320 may include an application to be run, an operation to be executed in the application, and a parameter required to execute the operation.

The NLU module 320 may generate one path rule or a plurality of path rules based on the intent and the parameter of the user input. For example, the NLU module 320 may receive a path rule set corresponding to the electronic device 100 from a path planner module and determine a path rule by mapping the intent and the parameter of the user input to the received path rule set.

Here, the path rule may include information on an operation for performing a function of an application or information on a parameter necessary for executing an operation. In addition, the path rule may include an operation order of the application. The electronic device 100 may receive the path rule, select an application according to the path rule, and execute an operation included in the path rule in the selected application.

The NLU module 320 may generate one path rule or a plurality of path rules by determining an application to be run based on an intent and a parameter of a user input, an operation to be executed in the application, and a parameter necessary for executing the operation.

For example, the NLU module 320 may generate a path rule by arranging the application to be run using information of the electronic device 100 and an operation to be executed in the application in the form of an ontology or graph model according to an intent of the user input. Also, the generated path rule may be stored in a path rule database through the path planner module. The generated path rule may be added to a path rule set of the NLU DB 325.

The NLU module 320 may select at least one path rule from the plurality of generated path rules. For example, the NLU module 320 may select an optimal path rule among the plurality of path rules. In another example, the NLU module 1220 may select a plurality of path rules when only some of the operations are specified based on the user's speech. The NLU module 320 may determine one of the plurality of path rules by an additional user input.

The DM module 330 may determine whether the intent of the user identified by the NLU module 320 is clear. For example, the DM module 330 may determine whether the intent of the user is clear based on whether the information of the parameter is sufficient. The DM module 330 may determine whether the parameters identified in the NLU module 320 are sufficient to perform a task based on one or more models and or rules stored in the Knowledge Base 335.

According to an embodiment, if the intent of the user is not clear, the DM module 330 may perform feedback for requesting necessary information from the user. For example, the DM module 330 may perform feedback requesting information on a parameter for recognizing a user's intent. In addition, the DM module 330 may generate and output a message for confirming a user inquiry including text changed by the NLU module 320.

According to an embodiment, the DM module 330 may include a content provider module. The content providing module may generate a result of performing a task corresponding to a user input when the content providing module performs an operation based on an intent and a parameter identified by the NLU module 1220.

The NLG module 340 may change designated information into a text form. The information changed into the text form may be in the form of natural language speech. Here, the designated information may be information on an additional input, information for guiding completion of an operation corresponding to the user input, or information for guiding an additional input of the user (e.g., feedback information for the user input).

The information changed into the text form may be displayed on the display 180 of the electronic device 100 or may be changed into a speech form by a text-to-speech module (TTS module). A speech synthesis process by the TTS module will be described later with reference to FIGS. 5A and 5B.

According to the speech recognition process as described above, the electronic device 100 may acquire information on an acoustic feature of the user's speech based on the received user's speech, information on a meaning of the user's speech, corresponding information on a user's intent, and information on a response on the user's speech and a meaning thereof based on the received user's speech.

Specifically, the electronic device may acquire text corresponding to the user's speech by recognizing the received user's speech and acquire the text for responding to the user's speech based on natural language processing of the text corresponding to the user's speech.

In addition, the electronic device may acquire information on an acoustic feature of the user's speech, information on a meaning of the user's speech, corresponding information on a user's intent, and information on a response on the user's speech and a meaning thereof from the text corresponding to the user's speech and the text for responding to the user's speech.

Meanwhile, when the information according to the speech recognition process as described above is acquired, the electronic device may acquire at least one of the plurality of parameter information.

For example, if the text corresponding to the user's speech is 'Tell me weather for tomorrow', the electronic device may acquire information of 'guide' as information on an application type that provides information on the output speech based on the fact that the user is inquiring about the weather tomorrow.

In the above example, if the text for responding to the user's speech is 'Heavy rain is expected tomorrow all day', the electronic device may obtain information of 'depressed tone' as information on a tone of an output speech based on the fact that tomorrow's weather is expected to be heavy rain all day.

In addition, the electronic device may acquire information on an acoustic feature of a user's speech based on the user's speech. The electronic device may acquire at least one of the plurality of parameter information based on the acquired information on the acoustic feature.

Specifically, the electronic device may acquire information on the user's feeling based on the acquired information on the acoustic feature and acquire at least one of the plurality of parameter information based on the acquired information on user's feeling.

For example, when information indicating that the user is 'furious' is acquired as information on the user's feeling based on the information on the acoustic feature of the user's speech, the electronic device may acquire information of 'calm tone' as information on a tone of an output speech based on the acquired information on the user's feeling.

In addition, according to an embodiment of the disclosure, the electronic device 100 may identify at least one topic of dialogue related to dialogue between the user and the electronic device based on information on a meaning of the user's speech and corresponding user's intent, and acquire at least one parameter information among a plurality of parameter information based on the identified subject of dialogue.

As described above, the electronic device 100 may acquire a plurality of parameter information for determining the style of the output speech based on the user's speech. That is, as described above, the electronic device 100 may acquire a plurality of parameter information based on the acquired information on the acoustic feature of the user's speech, information on the meaning of the user's speech, information on the user's intent corresponding thereto, information on the response on the user's speech and a meaning thereof, and the like.

Meanwhile, in case that the information on the acoustic feature of the user's speech, information on the meaning of the user's speech, information on the user's intent corresponding thereto, information on the response on the user's speech and a meaning thereof, and the like are acquired by the ASR module 310 and the NLU module 320, at least two of the acquired information may conflict with each other.

In this case, the electronic device may specifically compare probability information included in each information to acquire at least one of the plurality of parameter information by preferentially considering information having a higher probability. However, the disclosure is not limited thereto, and which information among the conflicting information is to be prioritized may vary in implementation example according to various embodiments of the disclosure.

Hereinafter, a process of acquiring a plurality of parameter information based on a user's speech will be described in more detail with reference to FIGS. 4A and 4B.

Figure 4A:
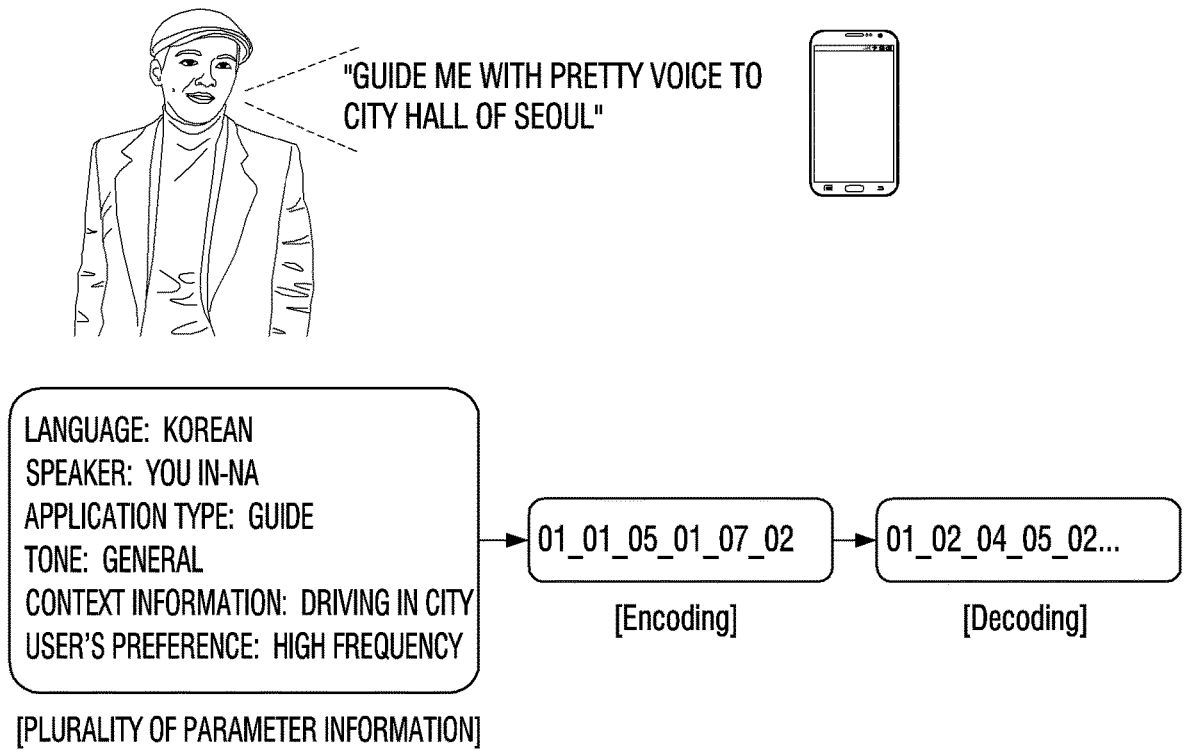
FIG. 4A is a diagram specifically illustrating a process of acquiring a plurality of parameter information based on a user's speech according to an embodiment of the disclosure.

FIGS. 4A and 4B are diagrams specifically illustrating a process of acquiring a plurality of parameter information based on a user's speech according to various embodiments of the disclosure.

Referring to FIG. 4A, the electronic device may receive a user's speech "Guide me with pretty voice to City Hall of Seoul".

In addition, according to the speech recognition process as described above, the electronic device may acquire information on an acoustic feature of the user's speech, information on the meaning of the user's speech, information on the user's intent corresponding thereto, information on a response on the user's speech and a meaning thereof, and the like.

Specifically, in the above example, the electronic device may acquire the information of 'YOU In-na' as information on a speaker of the output speech among the plurality of parameter information based on the information on the meaning of the user's speech of 'pretty voice'.

In addition, the electronic device may acquire the information 'guide' as the information on the type of the application that provides information on the output speech among the plurality of parameter information based on the information on the user's intent of 'Guide me'.

In addition, context information may be considered when acquiring the information 'guide' as information on the type of the application that provides the information on the output speech. Specifically, the electronic device may acquire the information of 'guide' in consideration of the information on the type of the application that provides information on the output speech among the plurality of parameter information together with the information on the user's intent together based on information on a state of the electronic device that the electronic device is currently running a 'navigation app'.

The electronic device may acquire information of "driving in city" as context information among the plurality of parameter information and information of 'high frequency' as information on a user preference regarding an output speech based on the information on a meaning of the user's speech of 'Guide me to City Hall of Seoul'. Here, the information of 'high frequency' is acquired based on the fact that the user prefers a high frequency speech because low frequency noise is more severe than the high frequency while driving in a city.

In addition, the electronic device may acquire information of 'Korean' as information on a language of an output speech among the plurality of parameter information based on the information on the language of the user's speech of 'Guide me with pretty voice to City Hall of Seoul'.

In addition, when information indicating that the user is in a 'general' emotional state as information on the user's feeling based on information on an acoustic feature of the user's speech of 'Guide me with pretty voice to City Hall of Seoul' is acquired, the electronic device may acquire information of 'general' as information on the tone of the output speech among the plurality of parameter information based on the acquired information on the user's feeling.

Meanwhile, referring to FIG. 4B, the electronic device may receive a user's speech of "What time is it for?".

Also, according to the speech recognition process as described above, the electronic device may acquire information on an acoustic feature of the user's speech, information on the meaning of the user's speech, information on the user's intent corresponding thereto, information on a response on the user's speech and a meaning thereof, and the like.

Specifically, in the above example, the electronic device may acquire information of 'notification' as information on the type of application that provides information on an output speech among the plurality of parameter information based on the information on the intent of the user's speech of "What time is it for?" in the above example.

If the electronic device acquires information indicating that the user is in a 'sensitive' emotional state as information on the user's feeling based on the information on the acoustic feature of the user's speech of "What time is it for?", the electronic device may acquire information of 'alarm' as information on the tone of the output speech among the plurality of parameter information based on the acquired information on the user's feeling.

In addition, based on the information on the intent of the user's speech of "What time is it for?", the electronic device may acquire information of 'slowly' as information on the user's preference regarding the output speech among the plurality of parameter information.

Meanwhile, as described above, the electronic device may acquire a plurality of parameter information based on not only a user's speech but also various information such as sensing information acquired by a sensor and image information acquired through a camera.

In particular, the electronic device may perform object recognition based on the image acquired through the camera, and acquire at least one of the plurality of parameter information based on the information acquired according to the object recognition.

Specifically, the electronic device may extract a feature of the object included in the acquired image using various methods such as edge detection, corner detection, histogram feature detection, image high frequency analysis, image variance analysis, and the like. Also, the electronic device may acquire a probability that the object included in the acquired image based on the extracted feature corresponds to each of a plurality of categories for classifying the object, and identify the object included in the acquired image accordingly.

Meanwhile, the electronic device may perform the object recognition as described above through the trained artificial intelligence model. Specifically, the electronic device may input the image acquired through the camera to the trained artificial intelligence model to acquire information on the image and identify the object included in the image. Here, the artificial intelligence model may be an artificial intelligence model learned using at least one of artificial intelligence algorithms such as machine learning, neural networks, genes, deep learning, and classification algorithms, and in particular, may include at least one artificial neural network among a convolutional neural network (CNN) and a recurrent neural network (RNN). For example, the electronic device may acquire an image of the user through the camera, perform object recognition by inputting the acquired image of the user to the artificial intelligence model as described above, and acquire information of 'elderly person' having a hearing problem accordingly. In addition, the electronic device may acquire information of 'high frequency/slow' as information on the user's preference regarding the output speech among the plurality of parameter information based on the information indicating that the user is an 'elderly person'.

In addition, the electronic device may determine whether the image of the user acquired through the camera corresponds to a previously registered image of the user, and if the image of the user acquired through the camera corresponds to the previously registered image of the user, the electronic device may acquire the information of 'high frequency/slow' as information on the user's preference regarding the output speech among the plurality of parameter information based on information on a registered age of the user together with the previously registered image of the user.

The electronic device may acquire information of 'home' as the context information of the electronic device among the plurality of parameter information based on location information of the electronic device by a global positioning system.

Meanwhile, before receiving the user's speech of 'What time is it for?', the electronic device may acquire at least one of the parameter information based on the information on a meaning of the output speech of 'Grandfather, it's time to take medicine', which is output from the electronic device.

That is, the electronic device may acquire the information of 'notification' and 'alert' respectively as the information on the type of the application and the tone of the output speech providing information on the output speech among the plurality of parameter information in consideration of the meaning of the speech output by the electronic device before receiving the user's speech.

The plurality of parameter information may be acquired based on various information that the electronic device may acquire within the scope of achieving the object of the disclosure, as well as the examples described above with reference to FIGS. 4A and 4B, and which information is to be preferentially considered in case that various information conflict with each other may be varied in implementation example according to various embodiments of the disclosure.

Meanwhile, when the plurality of parameter information is acquired through the process described above with reference to FIGS. 4A and 4B, as illustrated in FIGS. 4A and 4B, the electronic device may identify a TTS database and a weight set corresponding to the plurality of acquired parameters based on the plurality of acquired parameter information and output the output speech based on the identified TTS database and the identified weight set. That is, as shown in FIG. 4B, the electronic device may output an output speech of "It's time to take medicine (slowly with high tone)".

When a plurality of parameter information is acquired through the process described above, the electronic device may encode the plurality of acquired parameter information and transmit the encoded information to the server. An embodiment in which a part of a control process according to the disclosure is performed by a server communicatively connected to the electronic device will be described later with reference to FIGS. 7 and 8.

Meanwhile, as described above, the electronic device acquires a plurality of parameter information based on information on an available field of the plurality of TTS databases. Specifically, the plurality of parameter information may be determined within the limits of the type of the plurality of TTS databases. That is, it is based upon a premise that all of the plurality of parameter information acquired in the description of FIGS. 4A and 4B are acquired in consideration of the information on the type of the plurality of TTS databases together.

Meanwhile, at least one of the plurality of parameter information may be previously determined by the user. If it is difficult to acquire at least one of the plurality of parameter information based on the information on the type of the plurality of TTS databases, the received user's speech, and the context information of the electronic device, the plurality of the parameter information may be acquired by handling information set by the user as a default value.

Meanwhile, according to another embodiment of the disclosure, the electronic device may receive a plurality of user's speeches spoken from a plurality of users, acquire a plurality of texts for responding to the plurality of acquired user's speeches, and output speeches corresponding to the plurality of texts, respectively.

Specifically, the electronic device may receive a first user's speech spoken by a first user and output the first output speech adjusted in style by reflecting the information acquired from the received first user's speech in real time. When a second user's speech spoken by a second user is received after the first output speech is output, the electronic device may output a second output speech adjusted in style by reflecting the information acquired from the received second user's speech in real time.

Figure 5A:
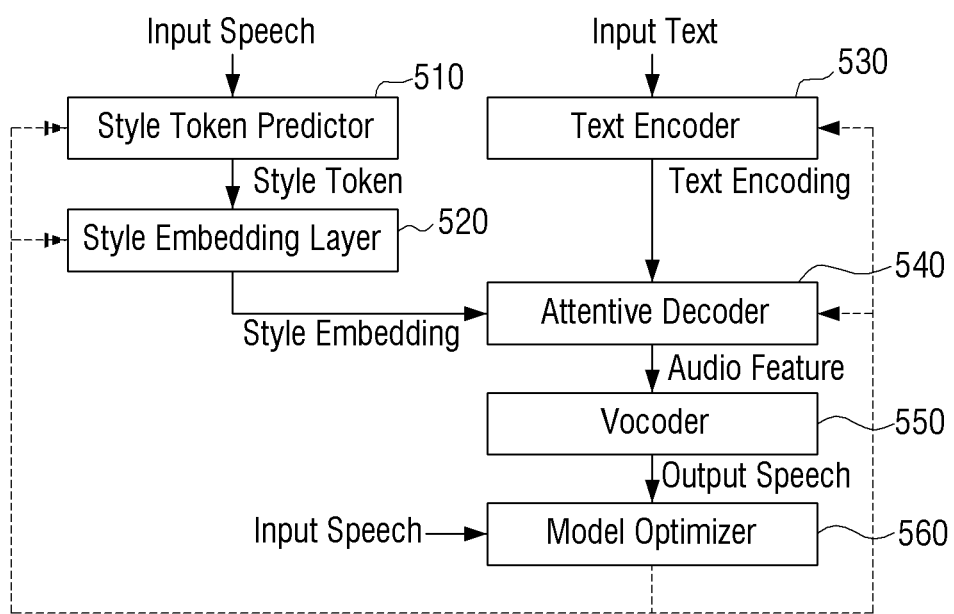
FIG. 5A is a diagram specifically illustrating a learning process of an artificial intelligence model and a speech synthesis process according to learning of an artificial intelligence model according to an embodiment of the disclosure.
Figure 5B:
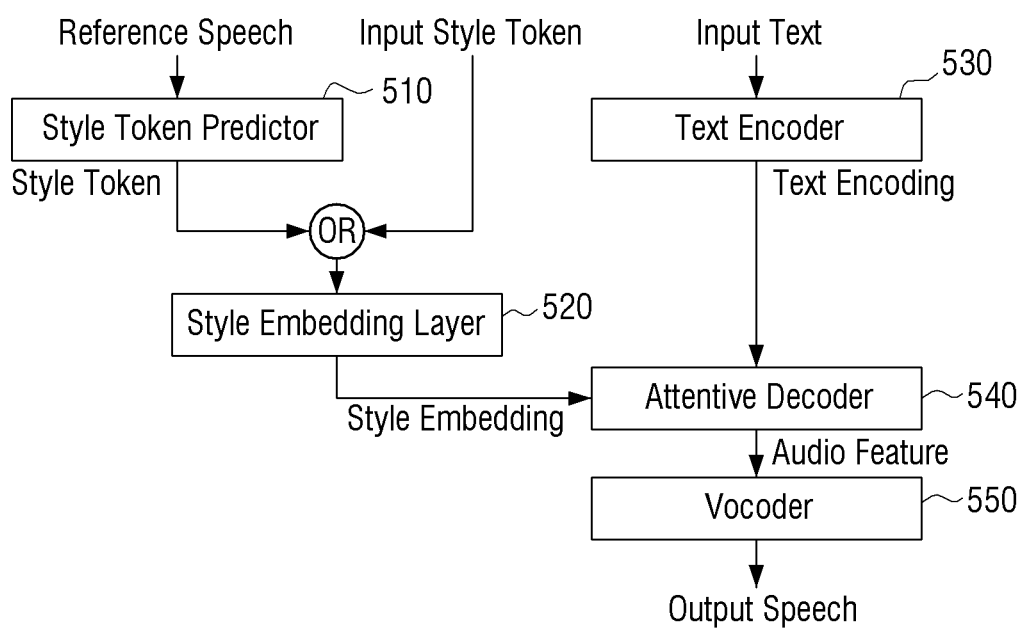
FIG. 5B is a diagram specifically illustrating a learning process of an artificial intelligence model and a speech synthesis process according to learning of an artificial intelligence model according to an embodiment of the disclosure.

FIGS. 5A and 5B are diagrams specifically illustrating a learning process of an artificial intelligence model and a speech synthesis process according to learning of an artificial intelligence model, respectively, according to various embodiments of the disclosure.

Referring to FIG. 5A, when a speech signal is input to a style token predictor 510, for example, measures of similarity between certain elements A, B, C, and D and the input speech signal may be learned. Here, the certain elements A, B, C and D may be related to a plurality of different factors that may determine the style of the output speech, respectively, and may be referred to as so-called style tokens.

As a result of the learning as described above, the style token predictor 510 may acquire a weight corresponding to each of a plurality of factors which may determine the style of the output speech. The plurality of weights indicates contributions to the plurality of factors which may determine the style of the output speech.

For example, a first weight among the plurality of weights included in each of the plurality of weight sets may indicate a contribution to a speech speed of the output speech, and a second weight among the plurality of weights may represent a pitch of the output speech.

As a result of the learning as described above, a style embedding layer 520 may output a plurality of weight sets which may be referred to as so-called style embedding.

For example, the style embedding layer 520 may acquire a weight set of {0.2, 0.1, 0.3, 0.4} which is a set of a plurality of weights respectively corresponding to certain elements A, B, C, and D. Furthermore, the style embedding layer 520 may acquire a plurality of weight sets corresponding to all sets of a plurality of parameter information for determining the style of the output speech.

For example, when it is assumed that a plurality of parameters are two types of tone of the output speech and context of the user, information on the tone of the output speech includes two information of 'general' and 'alert', and context information of the user includes two cases of 'home' and 'road driving', sets of the plurality of parameter information are four. In such a case, according to the disclosure, four or more weight sets corresponding to sets of the plurality of parameter information must also be secured. In addition, according to the learning process as described above, four or more weight sets may be acquired.

Meanwhile, there is no particular limitation on the number of certain elements as described above, and therefore, there is no particular limitation on the number of elements configuring the plurality of weight sets.

As described above, when the plurality of weight sets are acquired, the plurality of weight sets may be input to an attentive decoder 540 together with text encoded through a text encoder 530.

In addition, the attentive decoder 540 acquires a spectrogram based on the input encoded text and the plurality of weight sets, and delivers the acquired spectogram to a vocoder 550. When the spectogram is delivered to the vocoder 550, the vocoder may output an output speech based on an algorithm such as Griffin-Lim.

Meanwhile, a model optimizer 560 may compare the output speech acquired through the process described above with an input speech signal and delivers a comparison result to each module as described above to train each module.

Meanwhile, the modules such as the style token predictor 510 and the attentive decoder 540 as described above may be formed of various artificial neural network structures including an RNN.

FIG. 5B is a diagram illustrating a process of synthesizing an output speech adjusted in style using a plurality of weight sets acquired through the learning process according to an embodiment of the disclosure.

Specifically, when a speech signal is input as illustrated on the upper left of FIG. 5B, the trained artificial intelligence model may output an output speech adjusted in style. Meanwhile, when a weight for a specific certain element is directly input to the text encoder 530 as shown on the upper right of FIG. 5B, the trained artificial intelligence model may output a style-adjusted output speech without a reference speech signal.

Meanwhile, the structure of the artificial intelligence model and each module included in the artificial intelligence model have been described above with reference to FIG. 5A, and thus, a redundant description thereof will be omitted.

FIG. 6 is a flowchart illustrating a controlling method of an electronic device according to an embodiment of the disclosure.

Referring to FIG. 6, the electronic device may acquire text for responding to a received user's speech, at operation S610.

The electronic device may obtain a plurality of parameter information for determining a style of the output speech corresponding to the text based on the information on the types of the plurality of text-to-speech (TTS) databases and the received user's speech, at operation S620.

Here, the plurality of parameter information may include information on a language of the output speech, information on a speaker of the output speech, information on a type of the application that provides information on the output speech, information on a tone of the output speech, information on a user's preference regarding the output speech, context information of the user, and context information of the electronic device.

In addition, the TTS database refers to a set of data in which information for converting the acquired text into an output speech is stored. Also, the information on the types of the plurality of TTS databases refers to information on the types of output speech that may be synthesized by the plurality of TTS databases. Specifically, the information on the types of the plurality of TTS databases may include information on languages and speakers of the plurality of TTS databases.

In addition, the information on the types of the plurality of TTS databases may include information on an available field of the plurality of TTS databases. Here, the information on the available field of the plurality of TTS databases includes a range of styles that may be implemented by the output speech that may be synthesized by the corresponding TTS databases.

Also, the plurality of parameter information may be determined within a limit of the types of a plurality of TTS databases that the electronic device may access.

When the plurality of parameter information is acquired, the electronic device may identify a TTS database corresponding to the plurality of parameter information among the plurality of TTS databases, at operation S630.

For example, when information indicating that a language of the output speech is 'English' and information indicating that a speaker of the output speech is 'Yul Brynner', among the plurality of parameter information, are acquired, the electronic device may identify TTS databases corresponding to the spoken speeches 'Yul Brynner' and 'English' among the plurality of TTS databases.

Meanwhile, when the plurality of parameter information is acquired, the electronic device may identify a weight set corresponding to the plurality of acquired parameter information among a plurality of weight sets acquired through the trained artificial intelligence model, at operation S640.

Here, the plurality of weight sets may each include a plurality of weights for adjusting the information on the output speeches stored in the plurality of TTS databases. Also, the plurality of weight sets may be acquired by inputting a learning speech corresponding to the plurality of parameter information to the trained artificial intelligence model.

Specifically, the plurality of weights included in each of the plurality of weight sets indicates a contribution to each of the plurality of factors that may determine a style of an output speech. For example, a first weight among the plurality of weights included in each of the plurality of weight sets may indicate a contribution to a speech speed of the output speech and a second weight among the plurality of weights may represent a contribution to a pitch of the output speech.

When the weight set is identified, the electronic device may adjust information on the output speech stored in the TTS database identified based on the identified weight set, at operation S650.

Specifically, the electronic device may adjust the information on the output speech stored in the identified TTS database according to the contribution of each weight to each of the plurality of factors that may determine the style of the output speech based on the identified weight set.

When the information on the output speech is adjusted, the electronic device may synthesize the output speech based on the information on the output speech with the plurality of adjusted weight sets, and output an output speech corresponding to the text, at operation S660.

Meanwhile, the controlling method of the electronic device according to the embodiment described above may be implemented as a program and provided to the electronic device. In particular, the program including the controlling method of the electronic device may be stored and provided in a non-transitory computer readable medium.

A controlling method of an electronic device in a computer-readable recording medium including a program executing the controlling method of an electronic device includes: acquiring text to respond on a received user's speech; acquiring a plurality of parameter information for determining a style of an output speech corresponding to the text based on information on a type of a plurality of text-to-speech (TTS) databases and the received user's speech; identifying a TTS database corresponding to the plurality of parameter information among the plurality of TTS databases; identifying a weight set corresponding to the plurality of acquired parameter information among a plurality of weight sets acquired through a trained artificial intelligence model; adjusting information on an output speech stored in the identified TTS database based on the identified weight set; synthesizing an output speech based on the adjusted information on the output speech and outputting an output speech corresponding to the text.

Meanwhile, the non-transitory readable medium refers to a medium that stores data semi-permanently rather than a medium storing data for a short time such as a register, a cache, a memory, and the like, and may be read by a device. Specifically, the various applications or programs described above may be stored and provided in a non-transitory readable medium such as a CD, a DVD, a hard disk, a Blu-ray disk, a USB, a memory card, a ROM, or the like.

Figure 7:
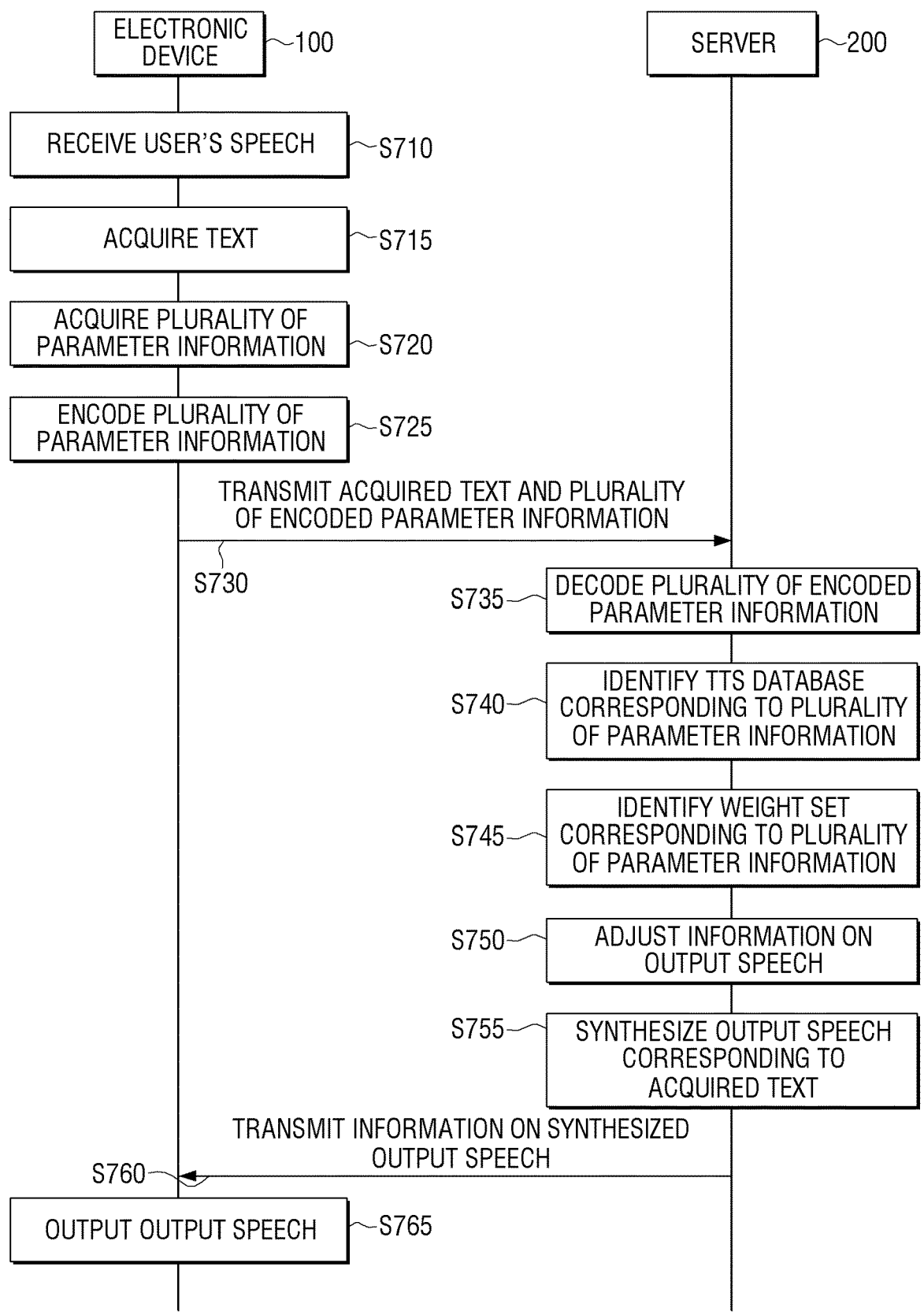
FIG. 7 is a sequence diagram illustrating an embodiment in which a part of a control process is performed by a server connected to an electronic device according to an embodiment of the disclosure.

FIGS. 7 and 8 are sequence diagrams illustrating an embodiment in which a part of a control process according to the disclosure is performed by a server connected to an electronic device according to various embodiments of the disclosure.

That is, a part of the control process as described above with reference to FIGS. 1 through 6 may be performed by a server connected to an electronic device. Hereinafter, redundant descriptions of the same contents described above with reference to FIGS. 1 through 6 will be omitted.

Referring to FIG. 7, the electronic device may receive a user's speech, at operation S710, and may acquire text for responding to the received user's speech, at operation S715.

Specifically, the electronic device may acquire the text corresponding to the user's speech by recognizing the received user's speech and acquire the text for responding to the user's speech based on natural language processing of the text corresponding to the user's speech. Also, the electronic device may acquire information on an acoustic feature of the user's speech, information on the meaning of the user's speech, information on the user's intent corresponding thereto, information on a response on the user's speech and a meaning thereof, and the like from the text corresponding to the user's speech and the text for responding to the user's speech.

Meanwhile, the electronic device may acquire a plurality of parameter information for determining a style of the output speech corresponding to the acquired text based on information on the types of the plurality of TTS databases and the received user's speech, at operation S720.

When the plurality of parameter information is acquired, the electronic device may encode the plurality of acquired parameter information, at operation S725. Also, the electronic device may transmit the acquired text and the plurality of encoded parameter information to a server 200 connected with the electronic device, at operation S730.

When receiving the acquired text and the plurality of encoded parameter information, the server 200 may decode the encoded plurality of parameter information, at operation S735, and identify a TTS database corresponding to the plurality of parameter information among the plurality of TTS databases, at operation S740. In addition, the server 200 may identify a weight set corresponding to the plurality of parameter information acquired from the plurality of weight sets, at operation S745.

Meanwhile, the server 200 may adjust information on the output speech stored in the identified TTS database based on the identified weight set, at operation S750, and synthesize the output speech based on the adjusted output speech information, at operation S755. When the output speech is synthesized, the server 200 may transmit information on the output speech to the electronic device, at operation S760.

When receiving the information on the output speech, the electronic device may output an output speech corresponding to text acquired based on the received information on the output speech, at operation S765.

FIG. 8 is a sequence diagram illustrating an embodiment in which a part of a control process is performed by a server connected to an electronic device according to an embodiment of the disclosure.

Referring to FIG. 8, the entire process of speech recognition and speech synthesis according to the disclosure may be performed by the server 200 connected to the electronic device.

That is, referring to FIG. 8, the electronic device may receive a user's speech, at operation S810, and transmit the received user's speech to the server 200 connected to the electronic device, at operation S815.

When the user's speech is received, the server 200 may acquire text for responding to the received user's speech, at operation S820. Specifically, the server 200 may acquire text corresponding to the user's speech by recognizing the received user's speech, and acquire text for responding to the user's speech based on natural language processing of the text corresponding to the user's speech.

The server 200 may acquire information on an acoustic feature of the user's speech, information on the meaning of the user's speech, information on the user's intent corresponding thereto, information on a response on the user's speech and a meaning thereof, and the like from the text corresponding to the user's speech and the text for responding to the user's speech. A specific speech recognition process is as described above with reference to FIG. 3.

When text for responding to a user's speech is acquired, the server 200 may transmit the acquired text and information acquired from the text to the electronic device, at operation S825. Specifically, the server 200 may transmit information on an acoustic feature of the user's speech, information on the meaning of the user's speech, information on the user's intent corresponding thereto, information on a response on the user's speech and a meaning thereof, and the like to the electronic device.

Meanwhile, the electronic device may acquire a plurality of parameter information for determining a style of the output speech corresponding to the acquired text, based on the information on the types of the plurality of TTS databases and the received user's speech, at operation S826. When the plurality of parameter information is acquired, the electronic device may encode the plurality of acquired parameter information, at operation S827. The electronic device may transmit the acquired text and the plurality of encoded parameter information to the server 200 connected with the electronic device, at operation S828.

When the acquired text and the plurality of encoded parameter information are received, the server 200 may decode the plurality of encoded parameter information, at operation S829, and identify a TTS database corresponding to the plurality of parameter information among the plurality of TTS databases, at operation S830. In addition, the server 200 may identify a weight set corresponding to the plurality of acquired parameter information among the plurality of weight sets, at operation S835.

Meanwhile, the server 200 may adjust the information on the output speech stored in the identified TTS database based on the identified weight set, at operation S840, and may synthesize the output speech based on the adjusted information on the output speech, at operation S845. When the output speech is synthesized, the server 200 may transmit information on the output speech to the electronic device, at operation S850.

When the information on the output speech is received, the electronic device may output an output speech corresponding to the text acquired based on the received information on the output speech, at operation S855.

According to an embodiment of the disclosure as described above, a part of the speech recognition process and the speech synthesis process according to the disclosure is performed by the server 200, whereby the speech recognition process and the speech synthesis process may be performed without having to establish a large-capacity TTS database and an artificial intelligence model in the electronic device.

In addition, information such as personal information of the user among the plurality of parameters is encoded and transmitted to the server 200 and the server 200 subsequently performs speech synthesis, thereby ensuring security of the personal information of the user.

However, the embodiment as described above does not limit implementation of the speech recognition process and the speech synthesis process according to the disclosure in the form of an on-device. Further, according to another embodiment of the disclosure, not only the received user's speech but also the context information, even user setting information, and the like acquired by the electronic device are transmitted to the server 200, and the server 200 may perform the operation of acquiring a plurality of parameter information, as well as the speech recognition and speech synthesis process.

According to various embodiments of the disclosure as described above, the electronic device may provide a customized output speech reflecting various kinds of information including information included in a speech spoken by the user and sensing information in real time.

Accordingly, an interactive TTS required in a robot or next generation agent technology field may be implemented by adaptively adjusting a style of the output speech based on the acquired information.

Meanwhile, functions related to an artificial intelligence (AI) according to the disclosure are operated through the processor 120 and the memory 110.

The processor 120 may be configured as one or a plurality of processors. Here, one or the plurality of processors may be a general-purpose processor, such as a CPU or an AP, a graphic-dedicated processor such as a GPU or VPU, or an AI-dedicated processor such as an NPU.

The one or a plurality of processors control to process the input data according to a predefined operation rule or artificial intelligence model stored in the memory 110. The predefined operation rule or artificial intelligence model may be created through learning.

Here, creating by learning refers to creating a predefined operation rule or artificial intelligence model having a desired characteristic by applying a learning algorithm to a plurality of learning data. Such learning may be made in a device itself in which the AI according to the disclosure is performed, or may be made through a separate server/system.

The AI model may include a plurality of neural network layers. Each layer has a plurality of weights (i.e., weight values) and a layer calculation is performed through calculation result of a previous layer and calculation of the plurality of weight values. Examples of neural networks include convolutional neural network (CNN), deep neural network (DNN), recurrent neural network (RNN), restricted Boltzmann machine (RBM), deep belief network (DBN), bidirectional recurrent deep neural network (BRDNN), and deep Q-Network, and the neural network in the disclosure is not limited to the above examples except a case where specified.

A learning algorithm is a method of training a predetermined target device (e.g., a robot) using a plurality of learning data so that the predetermined target device may make a decision or make a prediction by itself. Examples of the learning algorithm include supervised learning, unsupervised learning, semi-supervised learning, or reinforcement learning, but the learning algorithm in the disclosure is not limited to the above-mentioned examples except a case where specified.

Each component (e.g., the module or the program) according to various embodiments may, include one or a plurality of entities, and a portion of the above sub-components may be omitted, or other sub-components may be further included. Alternatively or additionally, some components (e.g., the module or the program) may be integrated in one component and may perform the same or similar functions performed by each corresponding components prior to the integration.

Operations performed by a module, a program, or other components according to various embodiments may be executed sequentially, in parallel, repeatedly, or in a heuristic method. Also, at least some operations may be executed in different sequences, omitted, or other operations may be added.

The term "part" or "module" used herein may include a unit including hardware, software and firmware and may be interchangeably used with the terms "logic", "logical block", "component" and "circuit", The "module" may be a minimum unit of an integrated part or may be a part thereof. The "part" or "module" may be a minimum unit for performing one or more functions or a part thereof. For example, the "module" may include an application-specific integrated circuit (ASIC).

Various embodiments of the disclosure may be implemented by software including an instruction stored in a machine (e.g., computer)-readable storage medium. The machine may be a device that calls the stored instruction from the machine-readable storage medium and operates depending on the called instruction and may include the electronic device (e.g., the electronic device 100) according to the disclosure.

When the instruction is executed by the processor, the processor may perform a function corresponding to the instruction directly or using other components under the control of the processor. The instruction may include a code generated or executed by a compiler or an interpreter.

The machine-readable storage medium may be provided in the form of a non-transitory storage medium. Here, the term "non-transitory" means that the storage medium is a tangible device and does not include a signal, but this term does not differentiate between where data is semi-permanently stored in the storage medium and where the data is temporarily stored in the storage medium.

According to an embodiment, the method according to various embodiments of the disclosure may be included and provided in a computer program product. The computer program product may be traded between a seller and a buyer as a product.

The computer program product may be distributed in the form of machine-readable storage medium (e.g., a compact disc read only memory (CD-ROM)) or through an application store (e.g., a Play Store™) online. In the case of online distribution, at least a portion of the computer program product may be temporarily stored or generated in a storage medium such as a memory of a manufacturer's server, an application store's server, or a relay server.

Each component (e.g., the module or the program) according to various embodiments may include one or a plurality of entities, and a portion of the above sub-components may be omitted, or other sub-components may be further included. Alternatively or additionally, some components (e.g., the module or the program) May be integrated in one component and may perform the same or similar functions performed by each corresponding components prior to the integration.

Operations performed by a module, a program, or other components according to various embodiments may be executed sequentially, in parallel, repeatedly, or in a heuristic method. Also, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory; and
a processor connected to the memory,
wherein the processor is configured to:
receive a user voice,
acquire a first text corresponding to the user voice,
acquire a second text for responding to the user voice based on the first text,
acquire information regarding a type of an application for providing an output speech, wherein the type of the application is determined based on at least one of the first text corresponding to the user voice or the second text for responding to the user voice,
acquire parameter information for determining a style of an output speech corresponding to the second text based on information on a type of a plurality of text-to-speech (TTS) databases, the first text, the second text, and the type of the application for providing the output speech,
identify a TTS database corresponding to the parameter information among the plurality of TTS databases,
identify a weight set corresponding to the parameter information among a plurality of weight sets acquired through a trained artificial intelligence model,
adjust information on the output speech stored in the TTS database based on the weight set,
synthesize the output speech based on the adjusted information on the output speech, and
output the output speech corresponding to the second text.

2. The electronic device as claimed in claim 1, wherein the processor is further configured to:
acquire the first text corresponding to the user voice by recognizing the user voice, and
acquire the second text to respond to the user voice based on natural language processing for the first text corresponding to the user voice.

3. The electronic device as claimed in claim 1, wherein the processor is further configured to:
acquire information on an acoustic feature of the user voice based on the user voice, and
acquire at least one of the parameter information based on the acquired information on the acoustic feature.

4. The electronic device as claimed in claim 1,
wherein the parameter information comprises at least one of context information of a user corresponding to the user voice or context information of the electronic device, and
wherein the processor is further configured to acquire at least one of the context information of the user and the context information of the electronic device based on sensing information acquired from a sensing device.

5. The electronic device as claimed in claim 1, further comprising:
a user interface,
wherein the processor is further configured to change at least one of the parameter information based on a user instruction input through the user interface.

6. The electronic device as claimed in claim 1, wherein the parameter information comprises at least one of information on a language of the output speech, information on a speaker of the output speech, information on a type of an application that provides information on the output speech, information on a tone of the output speech, information on a user's preference regarding the output speech, context information of a user corresponding to the user voice, or context information of the electronic device.

7. The electronic device as claimed in claim 1,
wherein the plurality of weight sets comprises a plurality of weights for adjusting information on output speeches stored in the plurality of TTS databases, respectively, and
wherein the plurality of weight sets is acquired by inputting a learning speech corresponding to the parameter information to the trained artificial intelligence model.

8. A method of controlling an electronic device, the method comprising:
receiving a user voice;
acquiring a first text corresponding to the user voice;
acquiring a second text for responding to the user voice based on the first text;
acquiring information regarding a type of an application for providing an output speech, wherein the type of the application is determined based on at least one of the first text corresponding to the user voice or the second text for responding to the user voice;
acquiring parameter information for determining a style of an output speech corresponding to the second text based on information on a type of a plurality of text-to-speech (TTS) databases, the first text, the second text, and the type of the application for providing the output speech;
identifying a TTS database corresponding to the parameter information among the plurality of TTS databases;
identifying a weight set corresponding to the parameter information among a plurality of weight sets acquired through a trained artificial intelligence model;
adjusting information on the output speech stored in the TTS database based on the weight set;
synthesizing the output speech based on the adjusted information on the output speech; and
outputting the output speech corresponding to the second text.

9. The method as claimed in claim 8,
wherein the acquiring of the text comprises:
acquiring the first text corresponding to the user voice by recognizing the user voice; and
acquiring the second text to respond on the user voice based on natural language processing for the first text corresponding to the user voice.

10. The method as claimed in claim 8, further comprising:
acquiring information on an acoustic feature of the user voice based on the user voice; and
acquiring at least one of the parameter information based on the acquired information on the acoustic feature.

11. The method as claimed in claim 8,
wherein the parameter information includes at least one of context information of a user corresponding to the user voice or context information of the electronic device, and
wherein the acquiring of the parameter information includes acquiring at least one of the context information of the user or the context information of the electronic device based on sensing information acquired from a sensing device.

12. The method as claimed in claim 8, wherein the acquiring of the parameter information includes changing at least one of the parameter information based on an input user instruction.

13. The method as claimed in claim 8, wherein the parameter information includes at least one of information on a language of the output speech, information on a speaker of the output speech, information on a type of an application that provides information on the output speech, information on a tone of the output speech, information on a user's preference regarding the output speech, context information of a user corresponding to the user voice, or context information of the electronic device.

14. The method as claimed in claim 8,
wherein the plurality of weight sets includes a plurality of weights for adjusting information on output speeches stored in the plurality of TTS databases, respectively, and
wherein the plurality of weight sets are acquired by inputting a learning speech corresponding to the parameter information to the trained artificial intelligence model.

15. A non-transitory computer-readable recording medium including a program that, when executed by at least one processor, performs a method of controlling an electronic device, the method comprising:
receiving a user voice;
acquiring a first text corresponding to the user voice;
acquiring a second text for responding to the user voice based on the first text;
acquiring information regarding a type of an application for providing an output speech, wherein the type of the application is determined based on at least one of the first text corresponding to the user voice or the second text for responding to the user voice;
acquiring parameter information for determining a style of an output speech corresponding to the second text based on information on a type of a plurality of text-to-speech (TTS) databases, the first text, the second text, and the type of the application for providing the output speech;
identifying a TTS database corresponding to the parameter information among the plurality of TTS databases;
identifying a weight set corresponding to the parameter information among a plurality of weight sets acquired through a trained artificial intelligence model;
adjusting information on the output speech stored in the TTS database based on the weight set;
synthesizing the output speech based on the adjusted information on the output speech; and
outputting the output speech corresponding to the second text.

* * * * *